United States Patent
Van Dyke et al.

(10) Patent No.: US 11,170,154 B1
(45) Date of Patent: Nov. 9, 2021

(54) LINGUISTICALLY-DRIVEN AUTOMATED TEXT FORMATTING

(71) Applicant: Cascade Reading, Inc., Edina, MN (US)

(72) Inventors: Julie A. Van Dyke, New Haven, CT (US); Michael Gorman, Edina, MN (US); Mark Lacek, Minneapolis, MN (US)

(73) Assignee: Cascade Reading, Inc., Edina, MN (US)

( * ) Notice: Subject to any disclaimer, the term of this patent is extended or adjusted under 35 U.S.C. 154(b) by 0 days.

(21) Appl. No.: 17/233,339

(22) Filed: Apr. 16, 2021

Related U.S. Application Data

(60) Provisional application No. 63/173,298, filed on Apr. 9, 2021.

(51) Int. Cl.
*G06F 40/103* (2020.01)
*G06F 40/205* (2020.01)
(Continued)

(52) U.S. Cl.
CPC .......... *G06F 40/103* (2020.01); *G06F 40/183* (2020.01); *G06F 40/205* (2020.01); *G06F 40/295* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 5,802,533 A | * | 9/1998 | Walker | G09B 5/065 715/201 |
| 6,279,017 B1 | * | 8/2001 | Walker | G09B 5/065 715/201 |

(Continued)

FOREIGN PATENT DOCUMENTS

KR 20160115566 A 10/2016

OTHER PUBLICATIONS

Craven, Timothy C. "Graphic display of larger sentence dependency structures." Journal of the American Society for Information Science 42, No. 5 (1991): 323-331. (Year: 1991).*

(Continued)

*Primary Examiner* — Frank D Mills
(74) *Attorney, Agent, or Firm* — Schwegman Lundberg & Woessner, P.A.

(57) ABSTRACT

Systems and techniques for linguistically-driven automated text formatting are described herein. Data representing the linguistic structure of input text may be received from Natural Language Processing (NLP) Services, including but not limited to constituents, dependencies, and coreference relationships. A text model of the input text may be built using the linguistic components and relationships. Cascade rules may be applied to the text model to generate a cascaded text data structure. Cascaded data may be displayed on a range of media, including a phone, tablet, laptop, monitor, VR/AR devices. Cascaded data may be presented in dual screen formats to promote more accurate and efficient reading comprehension, greater ease in teaching native and foreign language grammatical structures, and tools for remediation of reading-related disabilities.

26 Claims, 29 Drawing Sheets

(51) Int. Cl.
   *G06F 40/183* (2020.01)
   *G06F 40/30* (2020.01)
   *G06F 40/295* (2020.01)

(56) References Cited

U.S. PATENT DOCUMENTS

| | | | |
|---|---|---|---|
| 7,036,075 | B2 | 4/2006 | Walker |
| 7,069,508 | B1 | 6/2006 | Bever et al. |
| 7,346,489 | B1 | 3/2008 | Bever et al. |
| 7,743,324 | B1 | 6/2010 | Bever et al. |
| 7,823,061 | B2 | 10/2010 | Chan |
| 7,861,163 | B2 | 12/2010 | Walker |
| 8,190,419 | B1 | 5/2012 | Kinder |
| 8,209,601 | B2 | 6/2012 | Bever et al. |
| 8,306,356 | B1 | 11/2012 | Bever et al. |
| 8,418,057 | B2 | 4/2013 | Knight et al. |
| 8,731,905 | B1 | 5/2014 | Tsang et al. |
| 9,026,907 | B2 | 5/2015 | Lum |
| 9,916,295 | B1 | 3/2018 | Crawford |
| 10,062,295 | B2 | 8/2018 | Puvanachandran et al. |
| 10,303,742 | B2 * | 5/2019 | Joshi ............ G06F 40/258 |
| 2015/0286618 | A1 * | 10/2015 | Walker ............ G06F 40/253 704/9 |
| 2016/0062982 | A1 | 3/2016 | Wroczynski et al. |
| 2017/0046311 | A1 * | 2/2017 | Walker ............ G06F 40/30 |
| 2017/0358238 | A1 | 12/2017 | Casutt |
| 2019/0087239 | A1 | 3/2019 | Adibowo |
| 2021/0056263 | A1 * | 2/2021 | Xia ............ G06F 40/40 |

OTHER PUBLICATIONS

Walker, Randall, Charles Vogel, and C. O. Eagle. "Live Ink®: Brain-Based Text Formatting Raises Standardized Reading Test Scores." In Philadelphia, PA: National Educational Computing Conference. 2005. (Year: 2005).*

"International Application Serial No. PCT/US2021/026270, International Search Report dated Aug. 2, 2021", 3 pgs.

"International Application Serial No. PCT/US2021/026270, Written Opinion dated Aug. 2, 2021", 7 pgs.

Tate, Tamara, et al., "Visual-Syntactic Text Format: Improving Adolescent Literacy", Scientific Studies of Reading, 23(4), [Online], Retrieved from the Internet: <URL: https://escholarship.org/uc/item/4vw2g0m6>, (2019), 19 pgs.

Walker, Stand, et al., "Visual-Syntactic Text Formatting: A New Method to Enhance Online Reading", Reading Online, ISSN, [Online] Retrieved from the internet: <http://www.liveink.com/VSTF_ReadingOnline_IRA_2005_Walker.pdf>, (May 2005), 1096-1232.

* cited by examiner

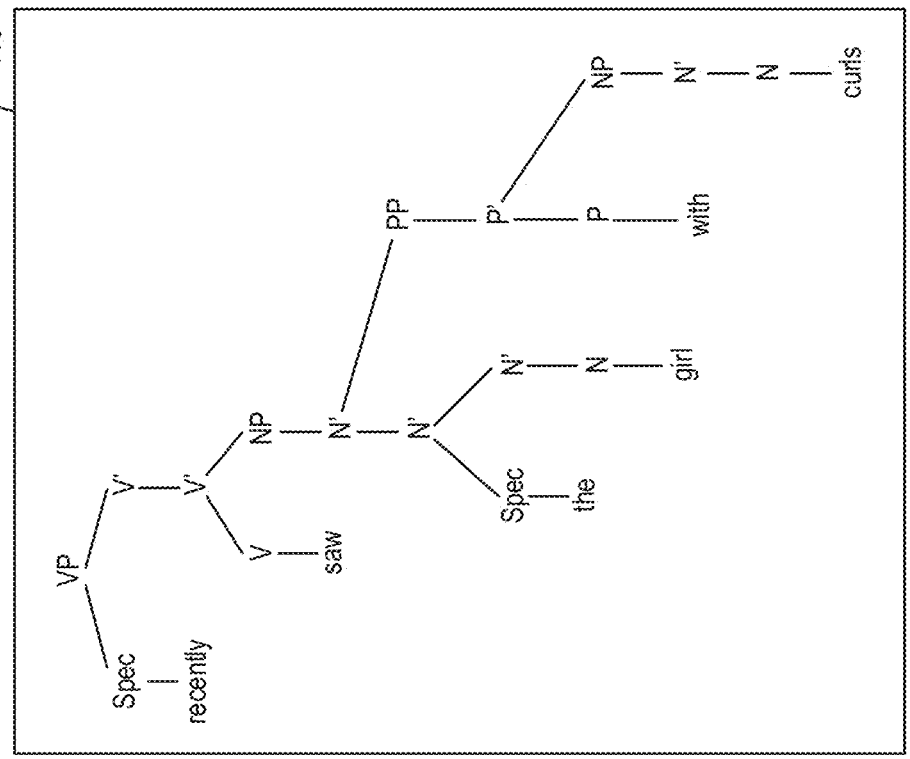
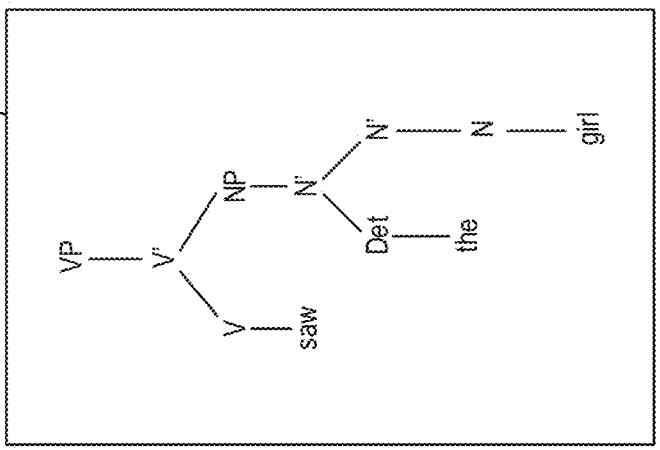
FIG. 1

400

405

The principal
  noticed
    that the janitor
      who cleaned
        in the classroom
      every night
  left quickly
    after the last announcement.

410

Since the virus
  first appeared
    in late January,
William
  has played down
    the risks
    of infection.

VERTICAL LINES FOR ILLUSTRATION AND ARE NOT PRESENTED AS OUTPUT.

*FIG. 4*

```
                                              ┌─ 1100
     ┌─ 1105
     ┌─────────────────────────────────────────┐
     │                                         │
     │   OBTAIN A TEXT PORTION FROM AN INTERFACE │
     │                                         │
     └─────────────────────────────────────────┘
                         │
                         ▼
     ┌─ 1110
     ┌─────────────────────────────────────────┐
     │                                         │
     │ SEGMENT THE TEXT PORTION INTO A PLURALITY OF DEPENDENT │
     │                 SEGMENTS                │
     │                                         │
     └─────────────────────────────────────────┘
                         │
                         ▼
     ┌─ 1115
     ┌─────────────────────────────────────────┐
     │                                         │
     │ ENCODE THE PLURALITY OF DEPENDENT SEGMENTS ACCORDING TO │
     │ CUING RULES DESCRIBING A HIERARCHICAL POSITION FOR EACH │
     │                 SEGMENT                 │
     │                                         │
     └─────────────────────────────────────────┘
                         │
                         ▼
     ┌─ 1120
     ┌─────────────────────────────────────────┐
     │                                         │
     │ DISPLAY THE ENCODED PLURALITY OF DEPENDENT SEGMENTS ON A USER │
     │ INTERFACE IN ACCORDANCE WITH USER PREFERENCES │
     │                                         │
     └─────────────────────────────────────────┘
```

1305
BUILD THE MODEL OF THE TEXT FROM DEPENDENCY AND CONSTITUENCY DATA OBTAINED BY PARSING THE TEXT

1310
GENERATE THE CASCADED TEXT DATA STRUCTURE ACCORDING TO CASCADE RULES APPLIED TO A MODEL OF THE TEXT

1315
DISPLAY THE SENTENCE OF TEXT IN RESPONSE TO A CASCADED TEXT DATA STRUCTURE

1405
OBTAIN A TEXT PORTION FROM AN INTERFACE

1410
PROCESS THE TEXT PORTION THROUGH NLP-SERVICES TO OBTAIN LINGUISTIC ENCODINGS

1415
APPLY ML CLASSIFIER TO THE LINGUISTIC ENCODINGS TO DETERMINE CASCADE

1420
DISPLAY THE CASCADE ON A USER INTERFACE IN ACCORDANCE WITH USER PREFERENCES

*FIG. 14*

LINGUISTICALLY-DRIVEN AUTOMATED TEXT FORMATTING

TECHNICAL FIELD

Embodiments described herein generally relate to machine automated text processing, driven by large-scale natural language processing (NLP) techniques derived from theoretical linguistics. In some embodiments, more specifically, to constituent and dependency parsing to produce cascaded text for the purposes of improving reading comprehension.

BACKGROUND

Standard text formatting entails presenting language in blocks, with little formatting beyond basic punctuation and line breaks or indentation indicating paragraphs. The alternative text format described herein presents text so that linguistic relationships are accentuated, providing support for comprehension processes which may increase accuracy or reduce reading time.

Cascaded text formatting transforms conventional block-shaped text into cascading patterns for the purpose of helping readers identify grammatical structure and related content. Text cascades make the syntax of a sentence visible. Syntactic units are the building blocks of a sentence. When parsing natural language, the reader's mind must do more than simply "chunk" the sentence into a string of smaller units. Rather, the reader's mind needs to determine dependencies between phrases and recognize how each phrase is related to larger ones that contain it. The cascaded text format helps readers identify these relationships within a sentence. The human mind's capacity to build sentences through the process of embedding language units inside other units enables language to represent an infinite number of meanings. Accordingly, a cascaded-parsing pattern is intended to enable the reader, when looking at a particular phrase, to immediately perceive how it relates to the phrases that precede or follow it.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 illustrates an example of parse trees defining constituents to be used for linguistically-driven automated text formatting, according to an embodiment.

FIG. 4 illustrates an example of cascaded text output for linguistically-driven automated text formatting, according to an embodiment.

FIG. 11 illustrates an example of a method for linguistically-driven automated text formatting, according to an embodiment.

FIG. 13 illustrates an example of a method for linguistically-driven automated text formatting, according to an embodiment.

FIG. 14 illustrates an example of a method for cascading text using a machine learning classifier for linguistically-driven automated text formatting, according to an embodiment.

DETAILED DESCRIPTION

Figure 2:
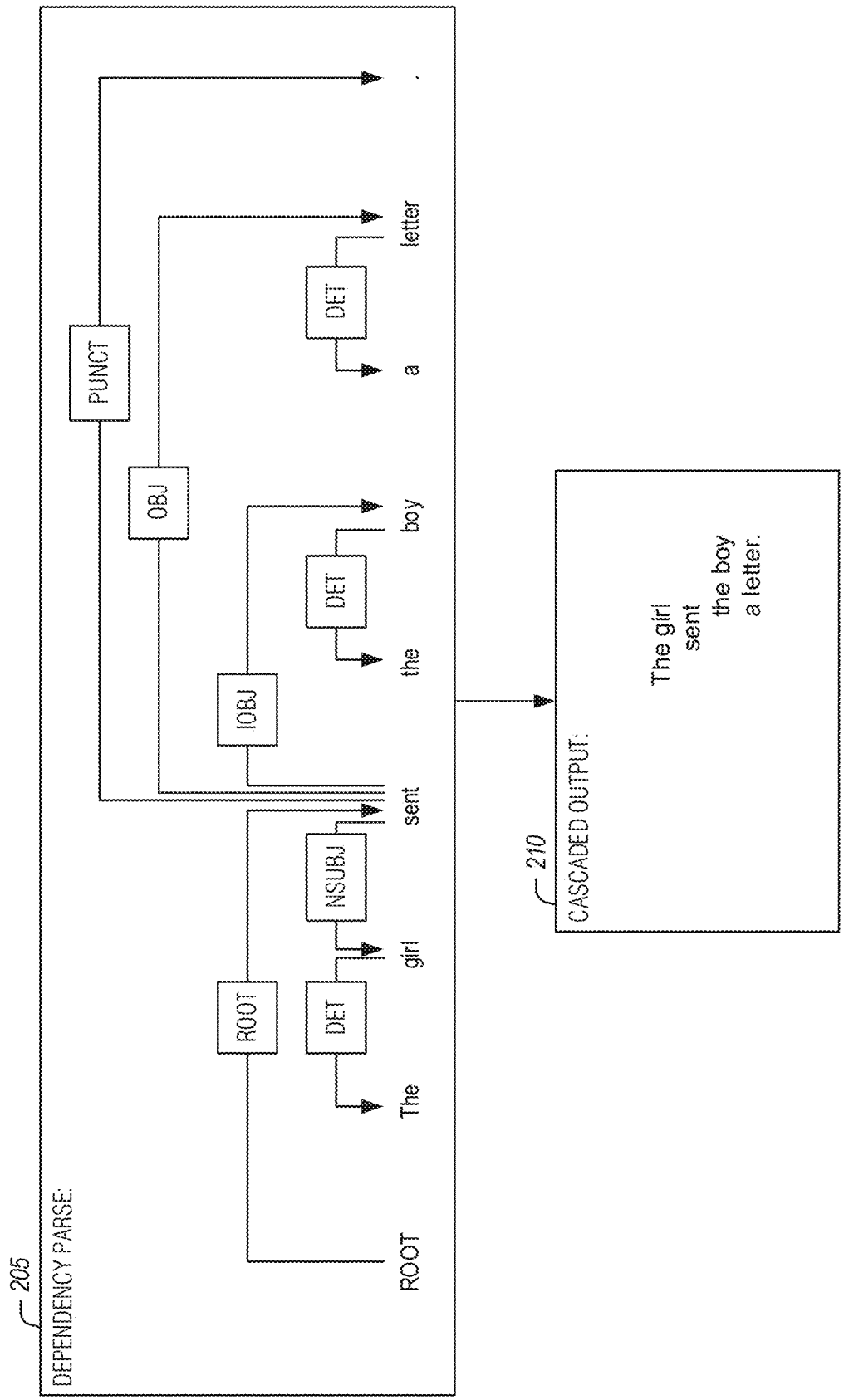
FIG. 2 illustrates a block diagram of an example of a dependency parse and cascaded text output for linguistically-driven automated text formatting, according to an embodiment.

The systems and methods discussed herein utilize linguistic analyses derived from linguistic theory to determine cascades. Such analyses are the state-of-the-art in automated natural language processing (NLP), allowing the systems and methods discussed herein to capitalize on inputs provided from NLP technology (hereafter, NLP Services).

The systems and methods discussed herein use NLP Services (e.g., a constituency parser, a dependency parser, a coreference parser, etc.) to parse incoming text into a representation that highlights its underlying linguistic properties. Display rules, including cascade rules, are then applied to these representations to make linguistic relationships more visible for the reader.

A linguistic constituent is a word, or group of words, that fills a particular function in a sentence. For example, in the sentence "John believed X", X could be substituted by a single word ("Mary") or ("facts") or by a phrase ("the girl") or ("the girls with curls") or ("the girl who shouted loudly") or by an entire clause ("the story was true."). In this case, all of these are constituents that fill the role of the direct object of "John believed." Notably, constituents have a property of completeness—"the story was" is not a constituent because it cannot stand alone as a grammatical unit. Similarly, "the girl who" or "the" is not a constituent. In addition, constituents may be embedded within other constituents. For example, the phrase "the girls with curls" is a constituent, but so is "the girls" and "with curls." However, the phrase "girls with" is not a constituent because it cannot stand alone as a grammatical unit. Consequently, "girls with" cannot fill any grammatical function, whereas the constituent phrases "the girls" or "with curls" are both eligible to fill necessary grammatical functions in a sentence. A part of speech is a category of syntactic function (e.g., noun, verb, preposition, etc.) of a word. Unlike parts of speech that describe the function of a single word, constituency delineates sets of words that function as a unit to fill particular grammatical roles in the sentence (e.g., subject, direct object, etc.). Hence, the concept of 'constituency' provides more information about how groups of words are related within the sentence.

The systems and methods discussed herein implement constituent cascading, in which constituents are displayed following a set of rules that determine various levels of indentation. Rules are jointly based on information from a constituency parser and a dependency parser. The constituency parser is an NLP Service that identifies constituents as just described using a theory of phrase structure (e.g., X-bar Theory). The dependency parser is an NLP Service that provides labeled syntactic dependencies for each word in a sentence, describing the syntactic function held by that word (and the constituent it heads.) The set of syntactic dependencies is enumerated by the universal dependency initiative (UD, http://universaldependencies.org) which aims to provide a cross-linguistically consistent syntactic annotation standard. Apart from English, the syntactic analysis may support a variety of additional languages, by way of example and not limitation, including: Chinese (Simplified), Chinese (Traditional), French, German, Italian, Japanese, Korean, Portuguese, Russian, and Spanish.

Through implementing a process of text cascading, the systems and methods discussed herein provide visual cues to the underlying linguistic structure in texts. These cues serve a didactic function, and numerous embodiments are presented that exploit these cues to promote more accurate and efficient reading comprehension, greater ease in teaching grammatical structures, and tools for remediation of reading-related disabilities.

In an example, the cascade is formed using line breaks and indentations based on constituency and dependency data obtained from parsing operations. Cascade rules are applied such that prioritization is placed on constituents remaining complete on a line, or indicated as a continuous unit in situations where device display limitations may prevent display on a single line. This promotes easy identification of which groups of words serve together in a linguistic function, so that constituents can be identified more easily. Accurate language comprehension requires the ability to identify relationships between the entities or concepts presented in the text. A prerequisite to this is the ability to parse out constituents (i.e., units of text that serve a discrete grammatical function.) Evidence suggests that poor comprehenders have substantial difficulties identifying syntactic boundaries that define constituents during both reading and oral production (e.g., Breen et al., 2006; Miller and Schwanenflugel, 2008). Moreover, boundary recognition is especially important for complex syntactic constructions of the sort found in expository texts (i.e., textbooks, newspapers, etc.). These facts suggest that the ability to identify syntactic boundaries in texts is especially important for reading comprehension, and that methods of cuing these boundaries may serve as an important aid for struggling readers. However, standard text presentation methods (i.e., presenting texts in left-justified blocks) do not explicitly identify linguistic constituents, or provide any means to support the process of doing so. The systems and methods discussed herein present a means of explicitly cuing syntactic boundaries and dependency relationships via visual cues such as line-breaks (e.g., carriage return, line feed, etc.), indentations, highlighting in color, italics, underlining, etc.

FIG. 1 illustrates an example of parse trees 100 defining constituents to be used for linguistically-driven automated text formatting, according to an embodiment. Linguistic theory provides established diagnostic tests for linguistic constituents (also called phrases) and formalisms for representing the relationships between them. These tests include by way of example, and not of limitation, i) do-so/one substitution, ii) coordination, iii) topicalization, iv) ellipsis, v) clefting/pseudoclefting, vi) passivization, vii) wh-fronting, and viii) right-node-raising, ix) pronominal replacement, and x) question answering, xi) omission, and xii) adverbial intrusion.

A predominant theory known as X' Theory (pronounced as "X-bar Theory") describes how phrases are created (Chomsky, 1970; Jackendoff, 1977). This theory abstracts over particular parts of speech (e.g., nouns, verbs, etc.) and asserts that all types of phrases, described as XPs or X-phrases (e.g., if X=a noun then it is a noun phrase; if X=verb then it is a verb phrase, etc.), are created via 3 general binary-branching re-write rules. First, a phrase ("XP) consists of an optional 'Specifier' and a required 'X-bar' in any order. Second, an X-bar may optionally consist of an X-bar and an adjunct, of any type licensed to modify the X-bar. Third, the X-bar consists of the obligatory head of the phrase (e.g., a word of any part of speech) and, optionally, any number of complement phrases licensed by the head, occurring in any linear order.

These rules may be used to create parse trees 100, such that specifiers and X-bars, and heads and complements are in a sister-hood relationship, and XPs are in a maximal position in the hierarchy, dominating the X', which in turn dominates the X. For example, a verb phrase 'saw the girl' may be represented as a VP with the V head and the NP complement, which is in turn represented as a N' with 'the' in the specifier position and the N' as the projection from the N head as shown in parse tree 105. Note that other adjunct phrases (like prepositional phrases) could be further attached to the N' phrase of the NP, as in the sentence 110 'saw the girl with the curls.' Similarly, specifier phrases may be attached to the V', such as the adverb 'recently' as shown in parse tree 110. Instances of a specifier have been simplified in FIG. 1, but these are also understood to be XP phrases.

Figure 6A:
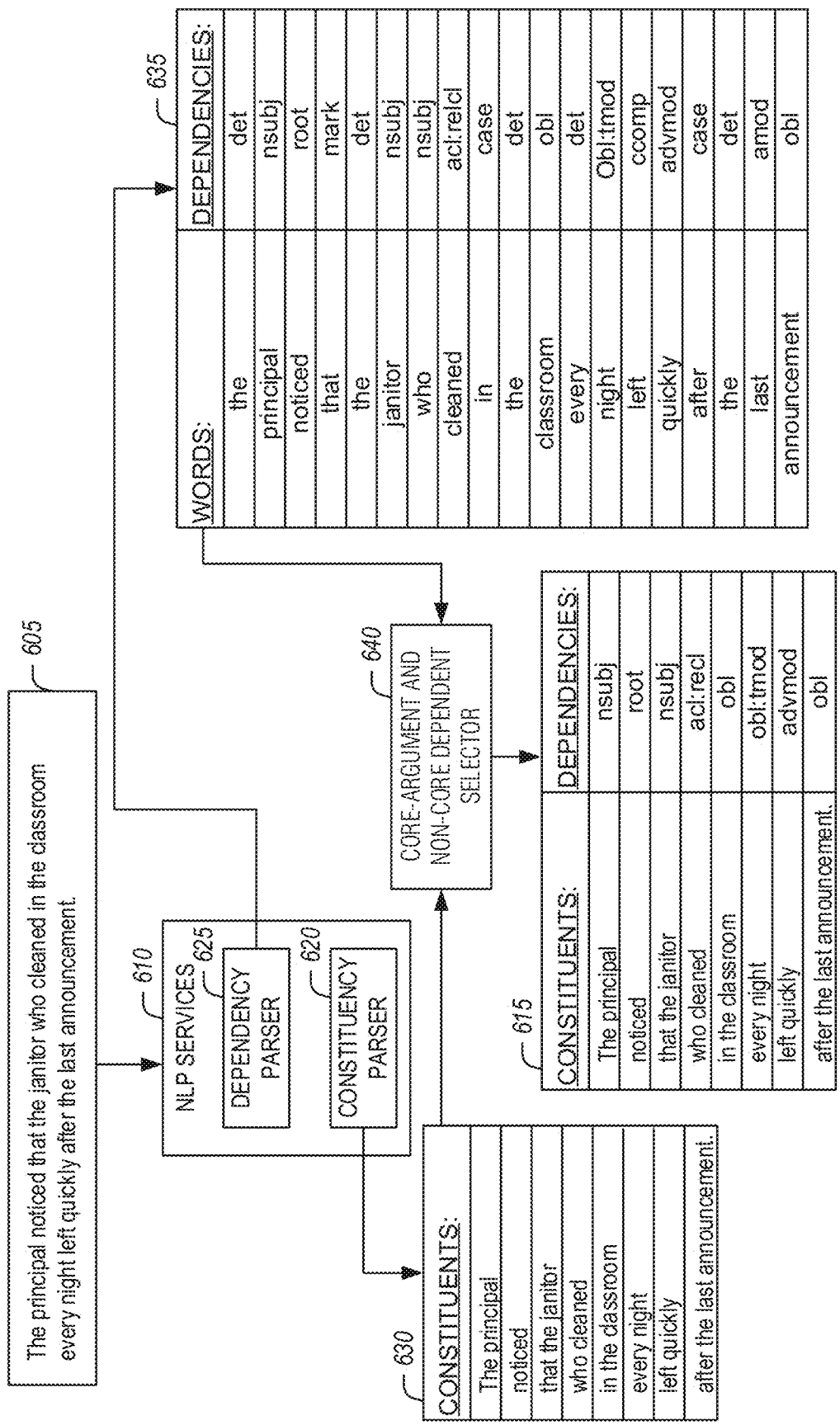
FIG. 6A illustrates a text portion segmented into a plurality of dependent segments based on grammatical information determined by a constituency and a dependency parser, according to an embodiment.

The systems and methods discussed herein utilize these phrase structure rules to specify Part 1 of a 2-part *Process of Constituent Cuing*. Part 1 stipulates how to divide a sentence into smaller pieces for display. Namely, sentences are broken up into constituent pieces, such that no words are separated from their dominating XP phrase. (e.g., as shown in FIG. 6A, element 1110 of FIG. 11, element 1205 of FIG. 12, etc.) For example, a break between 'with' and 'curls' would not happen because 'curls' is dominated by the PP headed by 'with'. Similarly, 'the' would not occur on a separate line from 'girl' because they are both dominated by the NP headed by 'girl'. Hence, a segment, for the purposes of the cascade generator, is defined as a phrase dominated by an XP which will stay together on a presentation line. A break between 'saw' and 'the' could happen, because 'the' is dominated by a separate XP phrase from 'saw' (i.e., saw is dominated by a VP and 'the' is dominated by an NP). Similarly, a break between 'girl' and 'with' may occur because 'with' is dominated by a PP and 'girl is dominated by an NP'. Line breaks occur at the presence of an XP because this characterizes a new constituent. If the line length is too small to allow line breaks between XPs, then line breaks will occur at X' levels, with an accompanying visual format indicating the continuation of the constituent (including, but not limited to, bracketing, flush indentation, color coding, italic style matching, etc.)

Example embodiments of Part 1 may utilize other phrase structure theories (e.g., Bare Phrase Structure, etc.) as a representative language for delimiting constituents. Some aspects of the systems and methods discussed herein are that line breaks occur at constituent boundaries and that constituent boundaries are established based on established linguistic diagnostic tests (e.g., substitution, movement, clefting, questioning, etc.). The constituent boundaries are constant regardless of specific phrase structure representation.

In an example embodiment, an automated constituent parser is used to provide constituents for use in the Cascade generator, but the cascade generator does not depend on use of an automated parser or on any particular automated parser. This parser is denoted as an NLP Service (e.g., such as the constituency parser 1025 of the NLP service 1020 as discussed in FIG. 10, etc.). It will be understood that a variety of parsing techniques and services may be used to identify constituents that are then processed by the cascade generator.

Figure 6B:
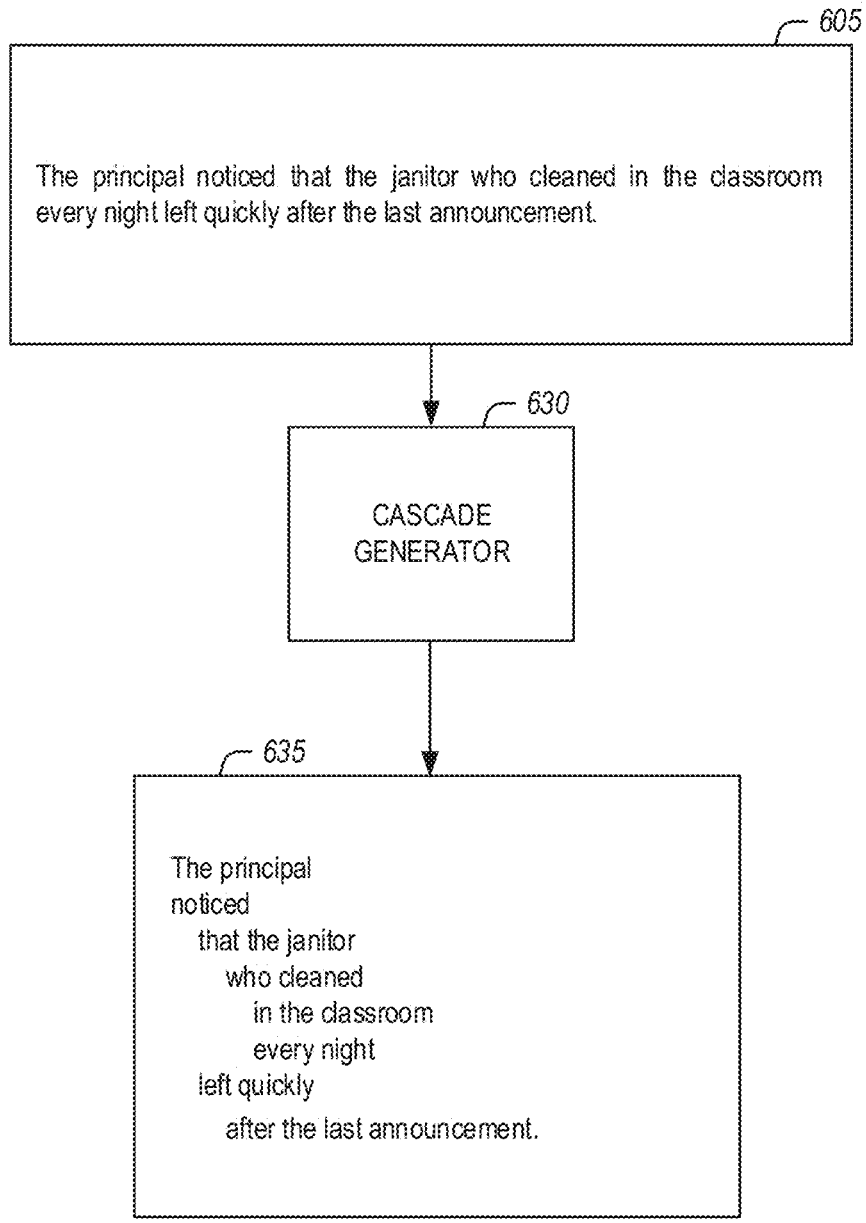
FIG. 6B illustrates a text portion displayed with a hierarchical position specified for each segment via linguistically-driven automated text formatting, according to an embodiment.

Part 2 of the Constituent Cascading operation specifies an indentation scheme to provide cues to linguistic structure (e.g., as shown in FIG. 6B, etc.). These cues are based on output from an automated dependency parser, which specifies the specific linguistic function of each word with respect to each other word (e.g., as shown in element 1115 or FIG. 11, element 1210 of FIG. 12, etc.). This function is used to determine horizontal displacement (indentation) of the cascade. The cues may be represented by horizontal displacement (indentation) of the constituent phrases within the cascade so that what is being indented are phrases on a given line. The cascade refers to the overall result including phrase boundaries, line breaks, and horizontal displacement.

The dependency parser alone cannot identify linguistic constituents. This is because the dependency parser assigns linguistic functions to words, and not to constituents. The system for linguistically-driven automated text formatting creates a language model (1050 in FIG. 10), which links a full constituent with the specific dependency associated with the head of that constituent (e.g., FIG. 6A). For example, the head of a constituent, XP, is the X; viz., the head of a noun phrase (NP) is the noun (N), the head of a prepositional phrase (PP) is the preposition (P). The dependency associated with the head of core arguments and non-core dependents is used to trigger line breaks and horizontal displacement. The dependency parser 625 (e.g., the dependency parser 1035 as described in FIG. 10, etc.) generates dependency output 635 (e.g., the dependency data 1040 as described in FIG. 10, etc.) that provides dependencies for words in the text. A core-argument and non-core dependent selector 640 receives constituency output 630 (e.g., the constituency data 1030 as described in FIG. 10, etc.) from the constituency parser 620 (e.g., the constituency parser 1025 as described in FIG. 10, etc.) and the dependency output 635 and selects dependencies related to the constituents to generate the linguistic structure 615 (e.g., the model 1050 as described in FIG. 10, etc.). Consequently, a system of linguistically-driven automated text formatting requires both constituency and a dependency information.

An alternative embodiment may include only a dependency parser, but also requires additional rules that define linguistic constituents (e.g., phrase structure rules). Such rules do not have to comprise a computationally implemented parser, but may include any collection of rules based on linguistic theory that describes constituents. This includes, but is not limited to, heuristics for identifying constituents based on keywords (e.g., prepositions, subordinating clause markers (viz., that, which, who), clause conjunctions (viz., either, but, and), and other single-word indicators of phrase structure.

An example embodiment of the Constituent Cascading operation is based on a characterization of constituents and dependencies within a sentence, plus any other linguistic features provided by the enlisted NLP-Services, including by way of example but not of limitation, coreference, sentiment analysis, named entity recognition, and topic tracking. In addition to cascading, the output from these parsers may be used to modify text via highlighting, color-coding, underlining, accompanying audio information, and the like to provide cognitive cues to reduce the cognitive load on the user.

While cascading is used as an example, the systems and methods discussed herein are applicable to a variety of visual, audible, and tactile outputs that provide a user with a reduced cognitive load when engaging a text. In another example embodiment, other formatting may be used to effectuate cuing for the user to reduce cognitive load. In an example embodiment, cuing may be achieved by modification of text formatting and/or accentuation such as using colors, italics, providing video output, vibratory output, audio output (e.g., tones, etc.), and the like using parsing outputs such as constituency data and dependency data.

FIG. 2 illustrates a block diagram of an example of a dependency parse 205 and cascaded text output 210 for linguistically-driven automated text formatting, according to an embodiment.

A dependency parser may adopt various labeling conventions or dependency sets with which to specify linguistic functions. The systems and methods discussed herein incorporate the use of any dependency set for specifying word-to-word linguistic functions, including those based on syntax, semantics, or prosody. In an example embodiment, the dependency set from the Universal Dependency (UD) initiative is adopted, which is a cooperative, open-source, international project for developing a cross-linguistically valid dependency set. The set of relations is available at https://universaldependencies.org/u/dep/index.html.

The UD dependency set is split into core arguments for nominals and clauses and dependents of other types, including non-core dependents (i.e., oblique arguments, adverbial clauses, relative clauses) and nominal modifiers (i.e., adjectives, noun attributes, and clausal modifiers). The Process of Constituent Cascading stipulates that core arguments and non-core dependents should be obligatorily indented under their heads. This indentation provides a visual cue to the core relationships within the sentence. Hence, a direct object or an indirect object (labeled as 'obj' or 'iobj' in the dependency parse 205) will be indented under the verb that they modify (often labeled 'root') as shown in cascaded output 210. In an example, dependents of nominals may also be indented under their heads. These include a varied set of nominal and adjectival modifiers (i.e., possessives, reduced relative clauses, numeric modifiers, and appositive phrases). The cascaded text output 210 includes the indentations based on the dependency parse 205. The amount of indentation may be specified in system preferences, as described below. In an example embodiment, dependent nominals are treated on a case-by-case basis depending on the length of the line or the type of constituent, with the goal of minimizing line breaks whenever possible. Different amounts of indentation may optionally be applied to different dependent types in order to distinguish them visually.

Figure 3:
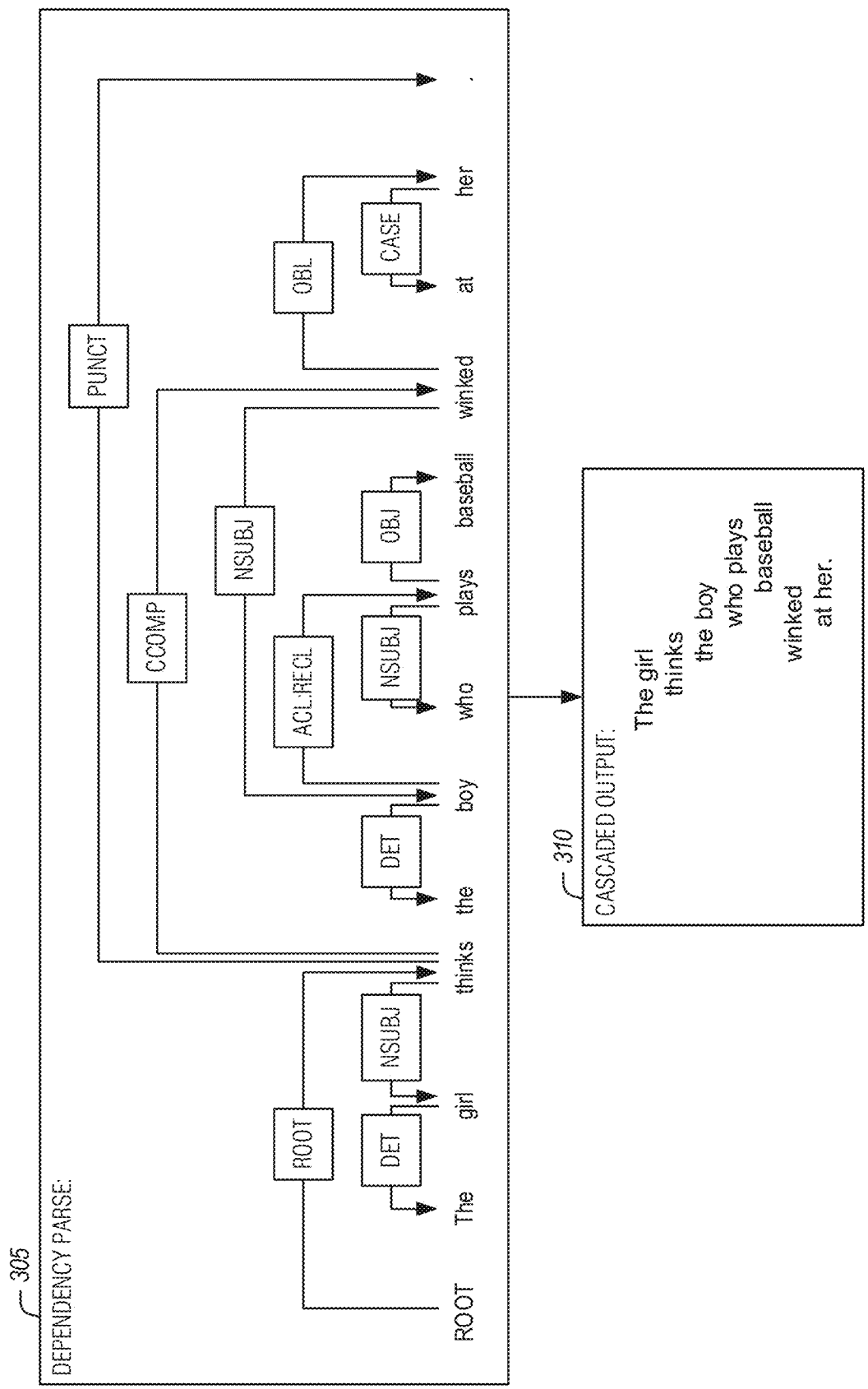
FIG. 3 illustrates a block diagram of an example of a dependency parse and cascaded text output for linguistically-driven automated text formatting, according to an embodiment.

FIG. 3 illustrates a block diagram of an example of a dependency parse 305 and cascaded text output 305 for linguistically-driven automated text formatting, according to an embodiment.

Indentation rules are applied to constituents. When constituents are embedded within other constituents (e.g., relative clause, complement clauses), un-indent rules apply to signal the completion of a constituent as shown in cascade output 310. Un-indent results in horizontal displacement being restored to the position of the head of the embedded phrase. This creates a cascade pattern that provides clear cues to the structure of the embedding and relationships between each verb and its arguments. The cascaded text output 310 includes the indentations based on the dependency parse 305 according to cascade rules specified in the cascade generator. Additional processing may be used to provide additional cues for cascade output displayed on devices with display limitations. For example, additional characters or other signals may be inserted to indicate that a constituent wraps to an additional line, etc. In these cases, horizontal displacement remains consistent for the wrapped constituent (e.g., if the constituent begins at location 40, then the wrapped segment will also begin at location 40 and will bear visual marking (e.g., bracketing, shading, etc. to indicate that it is a continuation.)

FIG. 4 illustrates an example of cascaded text output 400 for linguistically-driven automated text formatting, according to an embodiment. Horizontal positions indicate constituents that should be associated together. For example, the positioning of the verb "left" indicates that its subject is "the janitor" (and not "the principal", for example.) as shown in cascade 405. Similarly, the positioning of the phrase "every night" indicates that it goes with the verb "cleaned" and not "noticed", for example.) It is noted that the vertical lines shown in FIG. 4 are for illustrative purposes; they are not part of the text output.

Horizontal displacement is similarly used to signal preposed subordinate clauses by indenting the initial clause with respect to the matrix clause as shown in cascade 410. This technique provides clear cues as to the central information in the sentence, and to the subordinate status of the initial clause.

In another example embodiment, the Cascading process uses the Specifier and Complement positions from an X-bar theory analysis to determine indentations, without reference to specific syntactic dependencies as given by a dependency parser. This capitalizes on the fact that specifier and complement positions do themselves specify general dependencies between constituents in the sentence. However, in an embodiment limited to 2 types of dependencies (e.g., a Specifier and Complement, etc.), the information available for cuing the linguistic structure within a sentence is more limited.

In another example embodiment, the Cascading process determines indentations according to a list of particular dependencies with associated indentation amounts, which may be supplied by the user. For example, a user may prefer that direct objects be indented 4 spaces, but indirect objects will be indented only 2 spaces. In one embodiment, these user specifications are made by a teacher or tutor who may wish to emphasize particular grammatical relationships as part of an integrated lesson plan. Such specification may occur on a case-by-case basis, or for categories of dependency types. For example, a user may specify that core arguments should be indented more than non-core modifiers. Note that the Constituent Cascading operation determines IF a constituent is indented based on its dependency type; the user preferences determine how much indentation is reflected in the formatting. User preferences may additionally affect display attributes of the cascade, such as font type, font size, font color, line length, etc.

Figure 5:
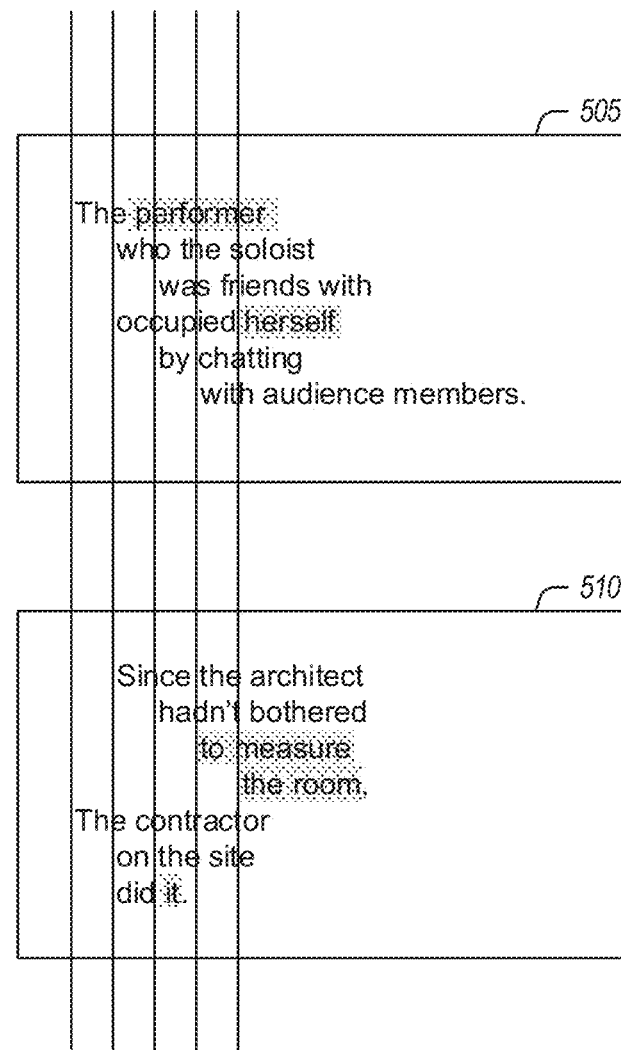
FIG. 5 illustrates an example of cascaded text output augmented to identify referentially linked phrases for linguistically-driven automated text formatting, according to an embodiment.
Figure 8:
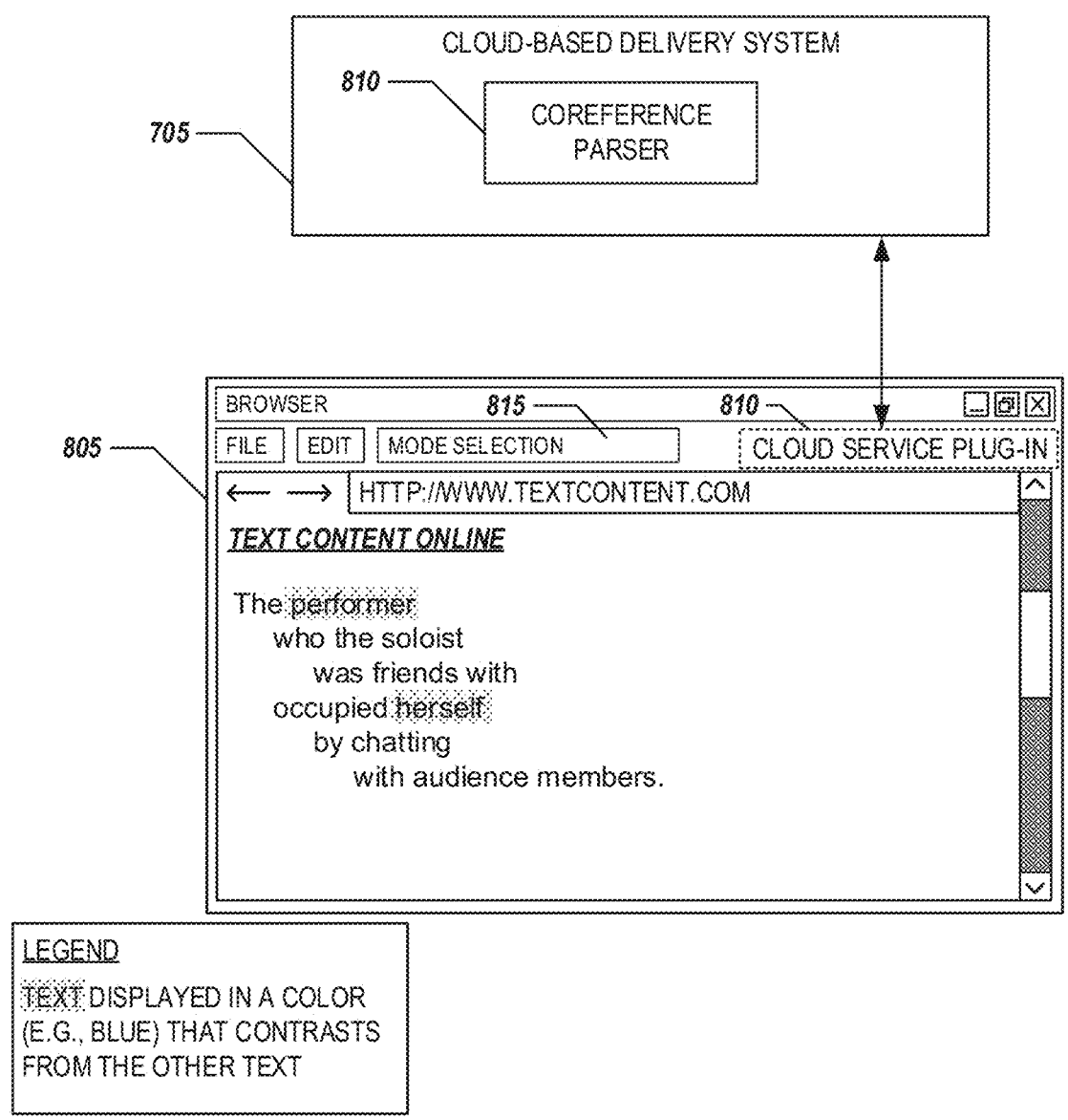
FIG. 8 illustrates an example of an environment for receiving linguistic modification to a cascade format for linguistically-driven automated text formatting, according to an embodiment.

In an example embodiment, the cascade automatically adjusts to fit constraints of the display device. For example, a computer screen may allow longer line lengths than display on a tablet or phone. If the line length is too small to allow line breaks between XPs, then line breaks will occur at X' levels, with no additional horizontal displacement. Hence, the visual cue associated with horizontal displacement is reserved to signal the beginning of a new linguistic dependency. Additional cuing (e.g., brackets, font styling, color) may be added to preserve easy identification of the constituent), FIG. 5 illustrates an example 500 of cascaded text output augmented to identify referentially linked phrases for linguistically-driven automated text formatting, according to an embodiment. Constituent Cascading operations define the cascade in relation to syntactic and semantic relationships between constituents. In an example embodiment, a separate NLP service that parses text into referents and antecedents is used to extend linguistically-driven automated text formatting to include Referential Cuing, such that visual cues (e.g., color, etc.) identify referential relationships between words or constituents (e.g., as shown in FIG. 8). This entails presenting antecedents with the same font characteristics as their pronominal referents (denoted in FIG. 8 with underlining). Referential cuing helps to prevent confusion in sentences such as those in FIGS. 5 and 8 regarding whether the person who 'occupied herself' is 'the performer' or 'the soloist' as shown in cascade 505. An example of Referential Cuing at the constituent level (e.g., the entire phrase 'measure the room' is the antecedent of 'it' is shown in cascade 510. Referential Cuing operations are implemented, by way of example and not of limitation, based on the output of an automated coreference resolution parser (NLP Service), such as that available in Stanford CoreNLP or AllenNLP. Coreference resolution finds expressions that refer to the same entity in a text. This information is incorporated into the language model that serves as input to the Cascade Generator. Coreference information may also be indicated by hand-coded rules or formatting, as might be produced by trained linguistic technicians, or by automated processing via non-rule-based probabilistic inference engines.

Augmentation of cascades to show coreference cues illustrates by example and not by limitation how linguistic properties other than those based on constituents or dependencies may be signaled in a cascade. For example, the coreference parser may be substituted with alternative NLP Services that produce analyses that show various linguistic relationships within the text. Examples include, but are not limited to, named entity recognition, sentiment analysis, semantic role labeling, textual entailment, topic tracking, prosodic analysis. These may be implemented either as rule-based or probabilistic inference systems. The output of these NLP Services provides information that may be used to modify display properties of the cascade in ways that emphasize linguistic relationships. These modifications may occur within sentences or between sentences and serve as cues to aid a reader or learner in maintaining coherence as s/he reads.

As described herein, there are provided various embodiments of systems and methods for generating cascaded text displays. In one embodiment 600 illustrated in FIG. 6A, a text portion 605 is segmented into a plurality of dependent segments based on grammatical information determined from the text portion 605 based on output from the NLP services 610. Each of these are a complete constituent, as defined by the constituency parser 620, and have a dependency role as determined by the dependency parser 625 associated with the head of the constituent. In one embodiment, constituents are identified by their maximal projection (XP) and assigned to the dependency relation associated with the head of that projection (X). For example, the constituent 'the principal' has two dependencies associated with it (det and nsubj), but the full NP constituent is assigned as an nsubj for interpretation by the cascade generator.

FIG. 6B illustrates a text portion 605 including indentations in a cascade 630 in accordance with a hierarchical position specified for each segment via linguistically-driven automated text formatting provided by a cascade generator 635, according to an embodiment.

Figure 7:
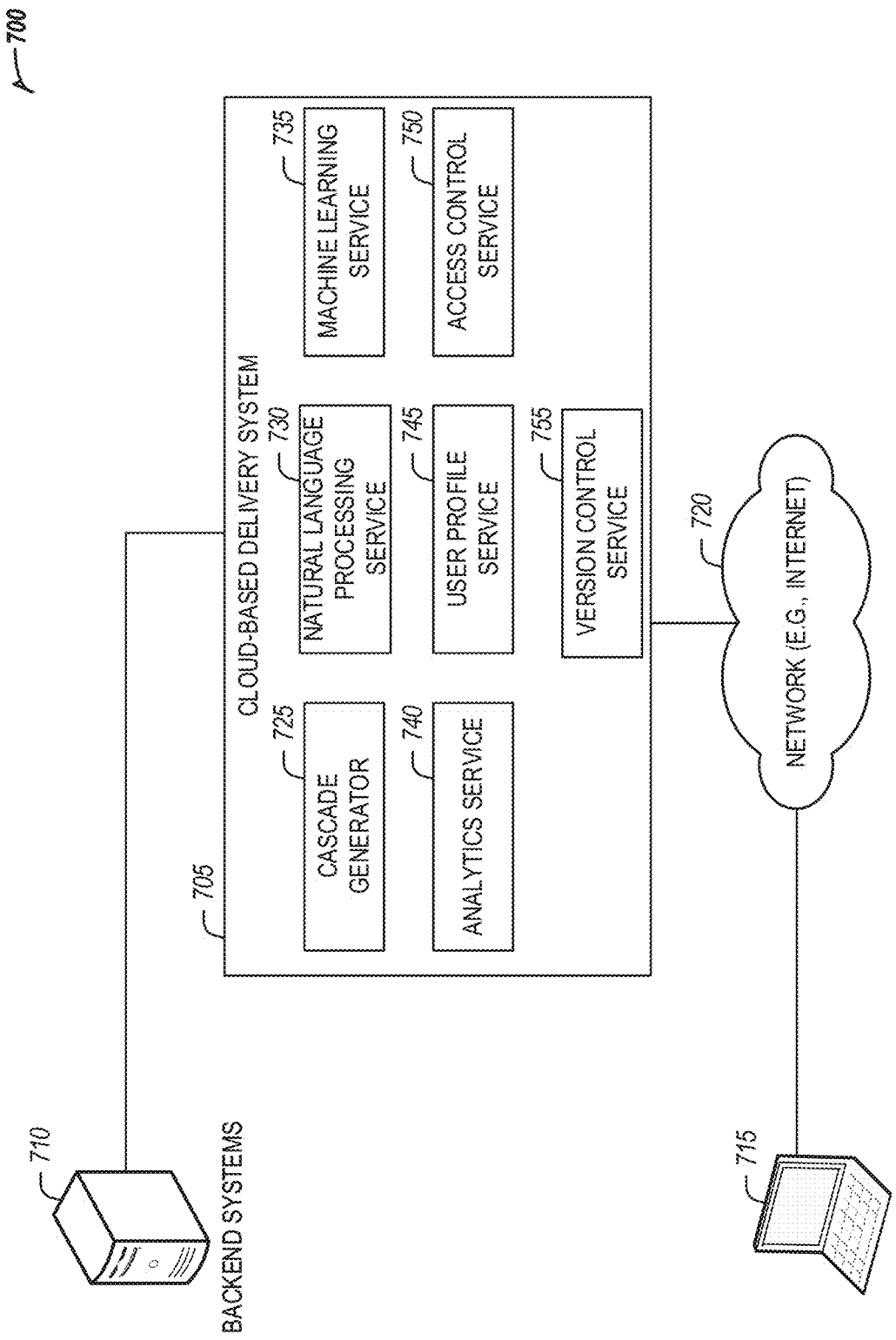
FIG. 7 illustrates a block diagram of an example of an environment and system for linguistically-driven automated text formatting, according to an embodiment.

FIG. 7 is a block diagram of an example of an environment 700 and a system 705 for linguistically-driven automated text formatting, according to an embodiment. FIG. 7 may provide features as described in FIGS. 1 to 5, 6A, and 6B. The environment may include the system 705 which may be a cloud-based delivery system (or other computing platform (e.g., a virtualized computing infrastructure, software-as-a-service (SaaS), internet of things (IoT) network, etc.)). The system may be distributed amongst a variety of backend systems 710 that provide infrastructure services such as computing capacity and storage capacity for a cloud services provider hosting the system 705. The system 705 may be communicatively coupled (e.g., via wired network, wireless network, cellular network, shared bus, etc.) to a network 720 (e.g., the internet, private network, public network, etc.). An end-user computing device 715 may be communicatively connected to the network and may establish a connection to the system 705. The end-user device may communicate with the system 705 via a web-browser, downloaded application, on-demand application, etc. In an example, components of the system may be prepared for delivery to the end-user computing device 715 via an installed application providing offline access to features of the system 705.

The system 705 may provide direct online connection via the end-user computing device 715, may distribute a set of packaged services to end-user application on the end-user computing device 715 that operates offline without internet connectivity, and as a hybrid with an end-user application that connects (e.g., via a plug-in, etc.) to the cloud service (or other computing platform) over the internet. Hybrid mode enables the user to read in cascade format regardless of connectivity, but still provides data to improve the system 705. The end-user application may be deployed in a number of forms. For example, a browser plug-in and extensions may enable users to change the formatting of the text they read on the web and in applications using the cascading format. In another example, the end-user application may be integrated into a menu bar, clip board, or text editor so that when a user highlights text using a mouse or hotkeys, a window may be presented with selected text rendered using the cascade format. In another example, the end-user application may be a portable document file (PDF) reader that may input a PDF file as an input source and may output the cascade format for display to the user. In yet another example, the end-user application may be an augmented image enhancement that translates live view from a camera and may apply optical character recognition (OCR) to convert the image to text and render the layout in cascade format in real time. The version control service 755 may track application versions and may provide periodic updates to the portable components provided to the application executing on the end-user computing device 715 when connected to the internet.

Figure 18:
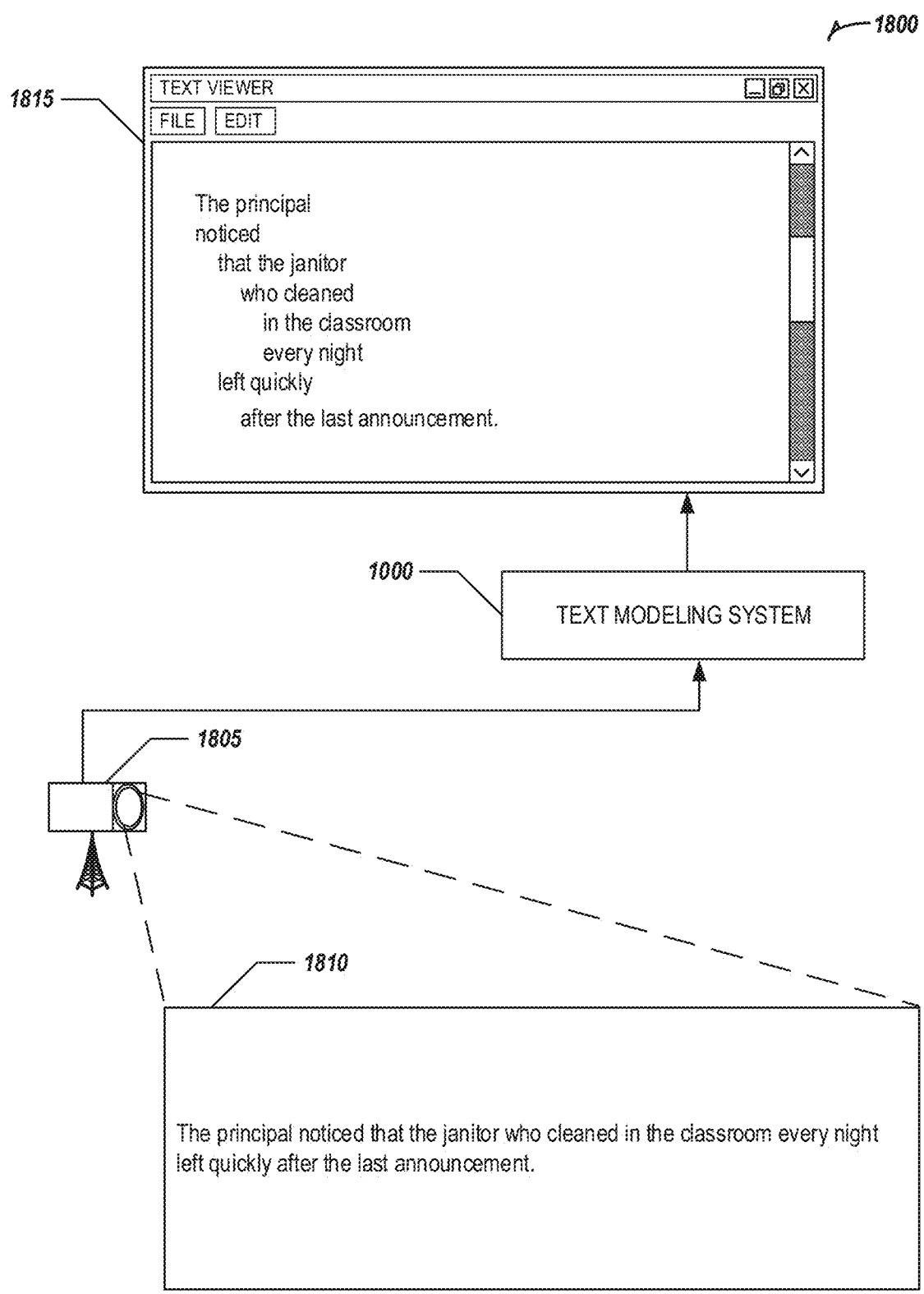
FIG. 18 illustrates an example of generating cascaded text from a captured image using natural language processing for linguistically-driven automated text formatting, according to an embodiment.

According to an example embodiment, end-user computing device 715 includes OCR capabilities that enable the user to capture an image of text via camera (e.g., on their phone, etc.) and have it instantly converted into the cascade formatted text (e.g., as shown in FIG. 18). According to an embodiment, the end-user computing device 715 includes or is mounted in a user-worn device such as smart glasses, smart contact lenses, and the like, where input of text seen by the user is converted into cascaded format for enhanced comprehension. In this way the text may be converted in real-time by the user's personal viewing device. According to another example embodiment, end-user computing device 715 provides augmented video (AV), augmented reality (AR), and virtual reality (VR) application of the cascade formatting may be completed within user-worn visual display devices, including AV and VR headsets, glasses, and contact or implantable lenses to allow the user to see text in the cascade format.

The systems and methods discussed herein are applicable to a variety of environments where text is rendered on a device by processing the text and converting the text to cascade formatting. Display of text on a screen requires instructions on rendering and the cascade instruction set may be inserted in the command sequence. This may apply to a document type (e.g., PDF, etc.) and to systems with a rendering engine embedded where the call to the rendering engine may be intercepted and the cascaded formatting instructions inserted. In an example, a user may scan a barcode, a quick response (QR) code, or other mechanism for providing access to content (e.g., on a menu, product label, etc.) and the content may be returned in cascaded format.

The system 705 may include a variety of service components that may be executing in whole or in part on various computing devices of the backend systems 710 including a cascade generator 725, a natural language processing (NLP) service 730, a machine learning service 735, an analytics service 740, a user profile service 745, an access control service 750, and a version control service 755. The cascade generator 725, the NLP service 730, the machine learning service 735, the analytics service 740, the user profile service 745, the access control service 750, and the version control service 755 may include instructions including application programming interface (API) instructions that may provide data input and output from and to external systems and amongst the other services.

The system 705 may operate in a variety of modes: an end-user (e.g., reader, etc.) converts text on local client using a local client that has a copy of offline components for generating cascaded text, the end-user may send text to the system 705 to convert standard text to cascaded text, a publisher may send text to the system 705 to convert text to cascaded format, the publisher may use an offline component set of the system 705 to convert its text to cascade format, and the publisher may publish text in traditional block formatting or cascaded formatting using the system 705.

The cascade generator 725 may receive text input and may pass the text to the NLP service 730 parser to generate linguistic data. The linguistic data may include, by way of example and not limitation, parts of speech, word lemmas, a constituent parse tree, a chart of discrete constituents, a list of named entities, a dependency graph, list of dependency relations, linked coreference table, linked topic list, list of named entities, output of sentiment analysis, semantic role labels, entailment-referenced confidence statistics. Hence, for a given text, linguistic analysis may return a breakdown of words with a rich set of linguistic information for each token. This information may include a list of relationships between words or constituents that occur in separate sentences or in separate paragraphs.

The cascade generator 725 may apply cascade formatting rules and algorithms to a language model generated by the machine learning service 735 created using constituency data and dependency data to generate probabilistic cascade output.

FIG. 8 illustrates an example of an environment 800 for receiving linguistic modification to a cascade format for linguistically-driven automated text formatting, according to an embodiment. A user interface 805 and plug-in 810 may provide features as described in FIGS. 1A, 1B, and 2-7. The user interface 805 and the plug-in 810 may connect to the system 705 as described in FIG. 7. The system 705 may include a coreference parser 810 that may parse text and identify related terms in the text. For example, "The performer" in the cascaded sentence displayed in the user interface 805 may be referred to by a pronoun in other portions of the sentence. "The performer" and "herself" may be highlighted (e.g., underlined, highlighted in color, displayed in a contrasting color from other text, italicized, etc.) to show that they refer to the same entity. In an example, the coreference parser 810 may be substituted with alternative NLP Services that produce analyses that show linguistic relationships within the text. A mode selection button 815 may be provided that allows a user to turn features on or off For example, text may be displayed in a cascade format and when a cascade mode is enabled, the related terms may be highlighted when coreference tracking is enabled, etc.

Figure 9:
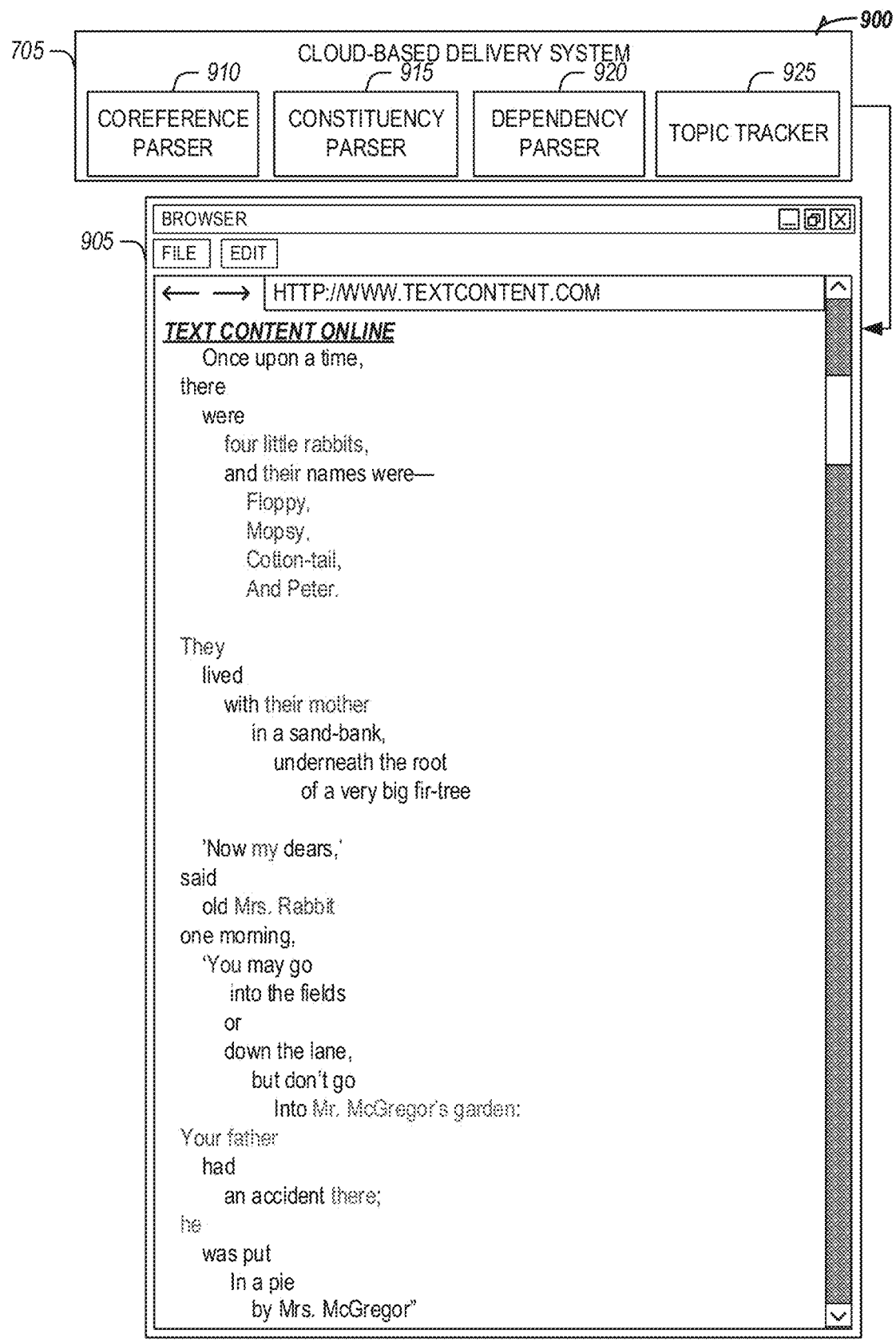
FIG. 9 illustrates an example of a system for coreference tracking across sentences for linguistically-driven automated text formatting, according to an embodiment.

FIG. 9 illustrates an example of a system 900 for coreference tracking across sentences for linguistically-driven automated text formatting, according to an embodiment. The example, 900 may provide features as described in FIGS. 1 to 5, 6A, 6B, and 7 to 8.

The system 900 may include a cloud-based delivery system 705 that may include a coreference parser 910, a constituency parser 915, a dependency parser 920, and a topic tracker 925. The coreference parser 910, constituency parser 915, dependency parser 920, and topic tracker 925 may provide an indication of relationships between particular pieces of text. These systems may work in conjunction with a cascade generator (e.g., the cascade generator 725 as described in FIG. 7, etc.) to output cascaded text to a user interface 905 with topics and pronominal references indicated by visual cues (e.g., using colors, etc.).

Figure 10:
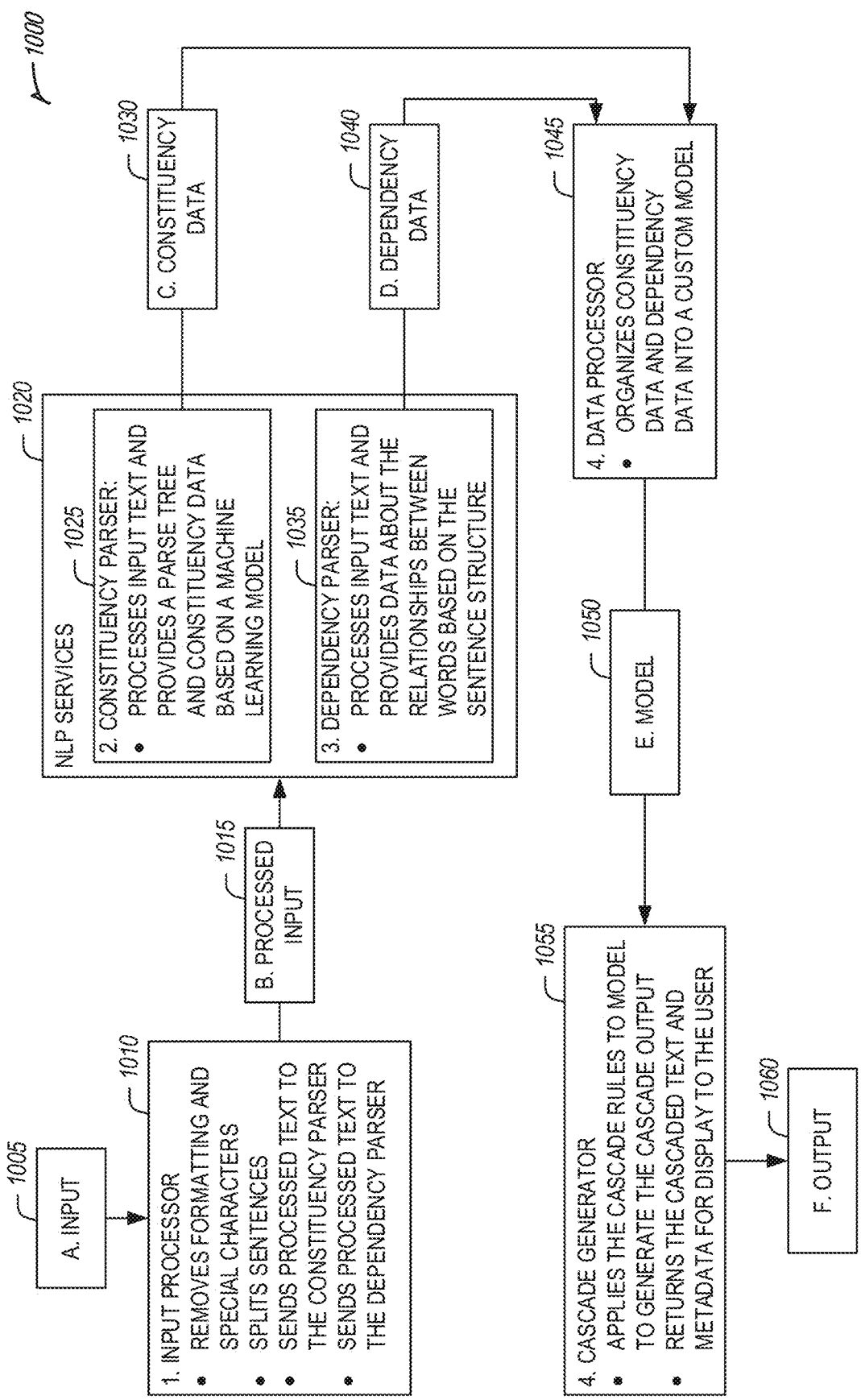
FIG. 10 illustrates a data flow diagram for an example of a system for linguistically-driven automated text formatting, according to an embodiment.

FIG. 10 illustrates a dataflow diagram for a system 1000 for linguistically-driven automated text formatting, according to an embodiment. The system 1000 may provide features as described in FIGS. 1 to 5, 6A, 6B, and 9.

A user may provide input 1005 that includes text. In an example, the text may be provided as entered text, text captured using OCR processing, text captured via an application or browser plugin, hypertext markup language (HTML), etc. The text may also include visual content, including figures, tables, graphs, pictures, and visually-enhanced text, including headings with font size or style enhancements. Input may also come directly from the user, such that, for example, the user may type in a text string "The patient who the girl liked was coming today." An input processor 1010 may process the text content to remove formatting and special characters and, in the case of paragraphs, split text into individual sentences.

Processed input 1015 that includes processed text may be transmitted by the input processor 1010 to a set of NLP services 1020. According to an embodiment, two primary NLP-Services are a constituency parser 1025 and a dependency parser 1035. A constituent of a sentence is a linguistically-defined part of a sentence, which may coincide with a word, phrase or clause. Constituents are organized hierarchically, defined by phrase structure rules (e.g., as shown in FIG. 1, etc.). The constituency parser 1025 may process the input text and may generate and transmit constituency data 1030 to the data processor 1045 that includes a parse tree (e.g. a constituency parse), a chart of discrete constituents, parts of speech, word lemmas, and metadata.

For example, the constituency parser 1025 may generate constituency data 1030 for "The patient who the girl liked was coming today." as shown in Table 1.

TABLE 1

```
{
  "class_probabilities": [[1.0, 1.8036938609355957e-10, 8.350951190055824e-15, ...]],
  "hierplane_tree": {
    "linkNameToLabel": { "VB": "pos", "VBD": "pos", "VBG": "pos", ...},
    "nodeTypeToStyle": { "ADD": ["color0"], "ADJP": [color5], ...},
    "root": {
      "attributes": ["S"],
      "children": [
        {
          "attributes": ["NP"],
          "children": [...],
          "link": "VP",
          "nodeType": "VP",
          "word": "was coming today"
        },
        ...
      ],
      ...
    },
    "text": "The patient who the girl liked was coming today ."
  },
  "num_spans": 55,
  "pos_tags": ["DT", "NN", "WP", "DT", "NN", "VBD", "VBD", "VBG", "NN", "."],
  "spans": [[0, 0 ], [0, 1 ], [0, 2], [0, 3], ...],
  "tokens": ["The", "patient", "who", "the", "girl", "liked", "was"; "coming", "today", "."],
  "trees": "(S (NP (NP (DT The) (NN patient)) (SBAR (WHNP (WP who)) (S (NP (DT the) (NN girl))
(VP (VBD liked))))) (VP (VBD was) (VP (VBG coming) (NP (NN today)))) (. .))"
}
```

The processed input 1015 that includes processed text may be transmitted by the input processor to a dependency parser 1035 of the NLP services 1020. The dependency parser 1035 may process the input text and may generate and transmit dependency data 1040, which provides data about dependency relationships between words to the data processor 1045. The dependency data 1040 may include a parse tree or directed graph, describing dependent children embedded under a root note with additional hierarchical embeddings (e.g. FIG. 3), tokens, dependency labels, and metadata. For example, the dependency parser 1035 may generate dependency data 1040 for "The patient who the girl liked was coming today." is shown in Table 3.

TABLE 2

```
{
  "hierplane_tree": {
    "linkToPosition": { "acomp": "right", "ccomp": "right", ... },
    "root": {
      "attributes": ["VERB"],
      "children": [
        {
          "attributes": ["NOUN"],
          "chiidren":[...],
          ...
        }
      ],
      "link": "root",
      "nodeType": "root",
      "spans": [{ "end": 42, "start": 35 }],
      "word": "coming"
    },
    "text": The patient who the girl liked was coming today ."
  },
  "pos": ["DET", "NOUN", "PRON", "DET", "NOUN", "VERB", "AUX", "VERB", "NOUN", "PUNCT"],
  "predicted _dependencies": ["dep", "nsubj", "prep", "det", "nsubj", "dep", "cop", "root, "tmod", "punct"],
  "predicted heads": [2, 8, 2, 5, 6, 3, 8, 0, 8, 8],
  "words": ["The", "patient", "who", "the", "girl", "liked", "was", "coming", "today", "."]
}
```

In another example, the dependency parser 1035 may generate dependency data 1040 for "The patient who the girl liked was coming today." is shown in Table 2.

TABLE 3

```
"stanza" : [
  {
    "lemma" : "the",
    "feats" : "Definite=Def|PronType=Art",
    "deprei" : "det",
    "head" : 2,
    "mise" : "start_char=0|end_char=3",
    "xpos" : "DT",
    "id" : 1,
    "text" : The,
    "upos" : "DET"
  },
  {
    "lemma": "patient",
    "feats" : "Number=Sing",
    "deprel" : "nsubj",
    "head" : 8,
    "misc" : "stat char=4|end_char=11",
    "id" : 2,
    "xpos" : "NN",
    "upos" : "NOUN",
    "text" : "patient"
  },
  {
    "lemma" : "who",
    "feats" : "PronType=Rel",
```

TABLE 3-continued

```
    "head" : 6,
    "deprel" : "obj",
    "misc" : "start_char=12|end_char=15",
    "id" : 3,
    "xpos" : "WP",
    "text" : "who",
    "upos" : "PRON"
  },
  {
    "lemma" : "the",
    "feats" : "Definite=Def|PronType=Art",
    "deprel" : "det",
```

TABLE 3-continued

```
    "head": 5,
    "misc" : "start_char=16|end_char=19",
    "upos" : "DET",
    "text" : "the",
    "id" : 4,
    "xpos" : "DT"
  },
  {
    "feats" : "Number=Sing",
    "lemma" : "girl"
    "xpos" : "NN"
    "id" : 5,
    "text" : "girl"
    "ups" : "NOUN",
    "misc" : "start_char=20|end_char=24",
    "deprel" : "nsubj",
    "head" : 6
  },
  {
    "xpos" : "VBD",
    "id" : 6,
    "upos" : "VERB",
    "text" : "liked",
    "head" : 2,
    "deprel" : "acl:relcl",
    "misc" : "start_char=25|end_char=30",
    "feats" : "Mood=Ind|Tense=Past|VerbForm=Fin",
    "lemma" : "like"
  },
  {
```

A data processor 1045 may generate a model 1050 using the constituency data 1030 and the dependency data 1040 and information from any other NLP services. The model 1050 may include parts of speech, word lemmas, a constituent parse tree, a chart of discrete constituents, a list of named entities, a dependency graph, a list of dependency relations, linked coreference table, linked topic list, output of sentiment analysis, semantic role labels, entailment-referenced confidence statistics.

In an example, the data processor 1045 may generate the model 1050 for "The patient who the girl liked was coming today." as shown in Table 4.

TABLE 4

```
{
    "pos_tags" : ["DT", "NN", "WP", "DT", "NN", "VBD", "VBD""VBG", "NN",
"."],
    "tokens" : ["The", "patient", who, the, "girl", "liked", "was", "coming", "today",
"."],
    "root" : {
        "lnk: "S",
        "children" : [
            {
                "attributes" : ["NP"],
                "word" : "The patient who the girl liked",
                "children" : [...],
                "link" : "NP",
                "nodeType" : "NP"
            },
            ...,
            {
                "constituency_pos": ".",
                "previous_constituency_pos": "NN",
                "dependency" : "punct",
                "attributes" : ["."],
                "dependency_pos": "PUNCT",
                "word": ".",
                "nodeType": ".",
                "previous_dependency": "tmod",
            }
        ],
        "nodeType" : "S"
        "word" : The patient who the girl liked was coming today .",
        "attributes" : ["S"]
    },
    "trees" : "(S (NP (NP (DT The) (NN patient)) (SBAR (WHNP (WP who)) (S (NP
(DT the) (NN girl))
(VP (VBD liked)))) (VP (VBD was) (VP (VBG coming) (NP (NN today)))) (. .))",
    "dependencies" : ["dep", "nsubj", "prep", "det", "nsubj", "dep", "cop", "root",
"tmod", "punct"],
    "pos" : ["DET", "NOUN", "PRON", "DET", "NOUN", "VERB", "AUX",
"VERB",
"NOUN", "PUNCT"]
}
```

The model 1050 may be processed by a cascade generator 1055. The cascade generator 1055 may apply cascade rules to the model 1050 to generate cascaded output 1060. Cascade rules are operations that are triggered for execution based on detection of specific constituents or dependencies in the parsing output. The operations executed by the cascade rules may include determining whether a line break should be inserted into output, an indent level for a line of text, and other output generation operations that create cues for a user. In an example, the cascade rules may be used to generate a text model that includes data identifying the placement of indentations and line breaks in text output to be displayed on a display device. The cascade generator 1055 may return the cascaded text and metadata in the cascaded output 1060. For example, the cascade generator 1055 may generate cascaded output 1060 using cascade rules as shown in Table 5 for the sentence "the patient who the girl liked was coming."

TABLE 5

1. Identify the initial constituent in the sentence and check dependency type of the head of the constituent. If a subordinate clause, then indent word 1. If beginning of the matrix clause, then no indent.
2. Identify the smallest constituent and its associated dependency and print on a line according to the rules for that dependency, Here, 'the patient' is identified as an NP with an nsubj dependency. Print on current line.
    The patient
3. Constituency Parser identifies the next constituent. In this example "who the girl liked" is identified as an SBAR constituent TABLE 5-continued with the dependency label acl:relcl, which indicates that it is a nominal modifier. The SBAR contains two XP sub-constituents, an NP and a VP, The NP holds the dependency nsubj, which triggers a line break at the beginning of the NP with indentation:
    The patient
        who the girl
4. The remaining portion of the SBAR (viz., the VP) is comprised of the 'liked'. Its acl:relcl dependency triggers a line break with indent:
    The patient
        who the girl
            liked
5. Constituency parser identifies 'was coming' as the next constituent. Dependency parser identifies 'coming' as the root associated with 'patient'. Unindent to the same level as 'the patient'.
    The patient
        who the girl
            liked
    was coming

TABLE 5-continued

6. Insert line break and indent before "today" because dependency
parser marked the node as "obl:tmod":
   The patient
     who the girl
      liked
   was coming
     today
7. Append punctuation:
   The patient
     who the girl
      liked
   was coming
     today.

In another example, the cascade generator 1055 may generate cascaded output 1060 using cascade rules as shown in Table 6.

TABLE 6

1. Append "The patient" as no other rules applied:
   The patient
2. Constituency Parser marked "who" as a "WP" part of speech.
Apply a line break and indent:
   The patient
     who
3. Parser marked phrase "the girl liked" as an S, which is comprised
of an NP with an nsubj dependency and a VP with an acl:relcl
dependency. Apply line break at the end of the NP:
   The patient
     who the girl
4. Since the NP is an nsubj in relation to the VP, apply linebreak with
indent under 'who the girl' and display VP
   The patient
     who the girl
      liked
4. Because 'liked' is the end of the VP constituent, unindent the next
word "was" to the level of the phrase previous to the S (i.e., "The
patient"):
   The patient
     who the girl
      liked
   was
5. Append "coming" to current line because it is in the same
constituent as 'was' (viz, under a VP):
   The patient
     who the girl
      liked
   was coming
6. Insert line break and indent before "today" because dependency
parser marked the node as "obl:tmod" (viz., oblique temporal modi-
fier)
   The patient
     who the girl
      liked
   was coming
     today
7. Append punctuation:
   The patient
     who the girl
      liked
   was coming
     today.

Other examples of cascaded text are shown in Table 7.

TABLE 7

We the people
  of the United States,
    in order
      to form
        a more perfect Union,
      establish
    Justice,
    insure
      domestic Tranquility,
  provide
    for the common defense,
  promote
    the general Welfare,
  and secure
    the Blessings
      of Liberty
    to ourselves
    and
    our Posterity,
do ordain
and
establish
  this Constitution
    for the United States of America.
The senator
  who the report
    criticized
referred
  to the chairman
    of the committee.
The principle
noticed
  that the janitor
    who cleaned
      in the classroom
      every night
  left quickly
    after the last announcement.

FIG. 11 illustrates an example of a method 1100 for linguistically-driven automated text formatting, according to an embodiment. The method 1100 may provide features as described in FIGS. 1 to 5, 6A, 6B, 7, and 10.

At operation 1105, a text portion may be obtained from an interface. In an example, the interface may be a physical keyboard, a soft keyboard, a text-to speech dictation interface, a network interface, or a disk controller interface. In an example, the text portion may be a string of text in a common format selected from the group: rich text, plain text, hypertext markup language, extensible markup language, or American Standard Code for Information Interchange.

At operation 1110, the text portion may be segmented into a plurality of dependent segments. The segmentation may be based on evaluation of the text portion using a constituency parser and a dependency parser. In an example, the constituency parser identifies complete segments that hold particular dependency roles as identified by the dependency parser.

At operation 1115, the plurality of dependent segments may be encoded according to cuing rules describing a hierarchical position of each segment. In an example, a text model of the text portion may be built using output of the constituency and dependency parsers, plus other NLP-Services, and cascade rules may be applied to the text model to generate encoded segments. In an example, the text model may be a data structure including parts of speech, lemmas, constituency chart, parse tree and a list of dependencies for each word in the text. An encoded segment may include text and metadata defining a hierarchical position for the dependent segments. In an example, the dependent segments may be segments from a sentence. In an example, the hierarchical position may correspond to an offset of the encoded segment relative to another one of the dependent segments in the user interface. In an example, the encoded segments may include line break data and indent data. In an example, segmentation of the text portion may include appending the text portion to another text portion, modifying indentation of the text portion, or inserting a line break before the text portion.

At operation 1120, the encoded plurality of dependent segments may be displayed on a user interface in accordance with user preferences. In an example, the dependent segments may be encoded using JavaScript Object Notation, extensible markup language, or American Standard Code for Information Interchange. In an example, encoding the dependent segments may include concatenating the dependent segments of several sentences to create a text composition. In an example, the combined sentences may be written to a file, communicated via cloud protocols, or displayed directly on an output device.

In an example, the encoded segments may be received. The encoded segments may be parsed to retrieve respective texts and hierarchical positions for the encoded segments and the texts may be displayed in accordance with the positions. In an example, display of the texts in accordance with the positions may include modification of offsets for portions of the texts and adjustment of line height of portions of the texts. In an example, the offsets may be from the left in a left-to-right language and from the right in a right-to-left language.

In an example, display of the texts in accordance with the positions may include appending, modification of indents, and modification of line breaks without affecting the positional arrangement of the text based on the linguistic structure.

Figure 12:
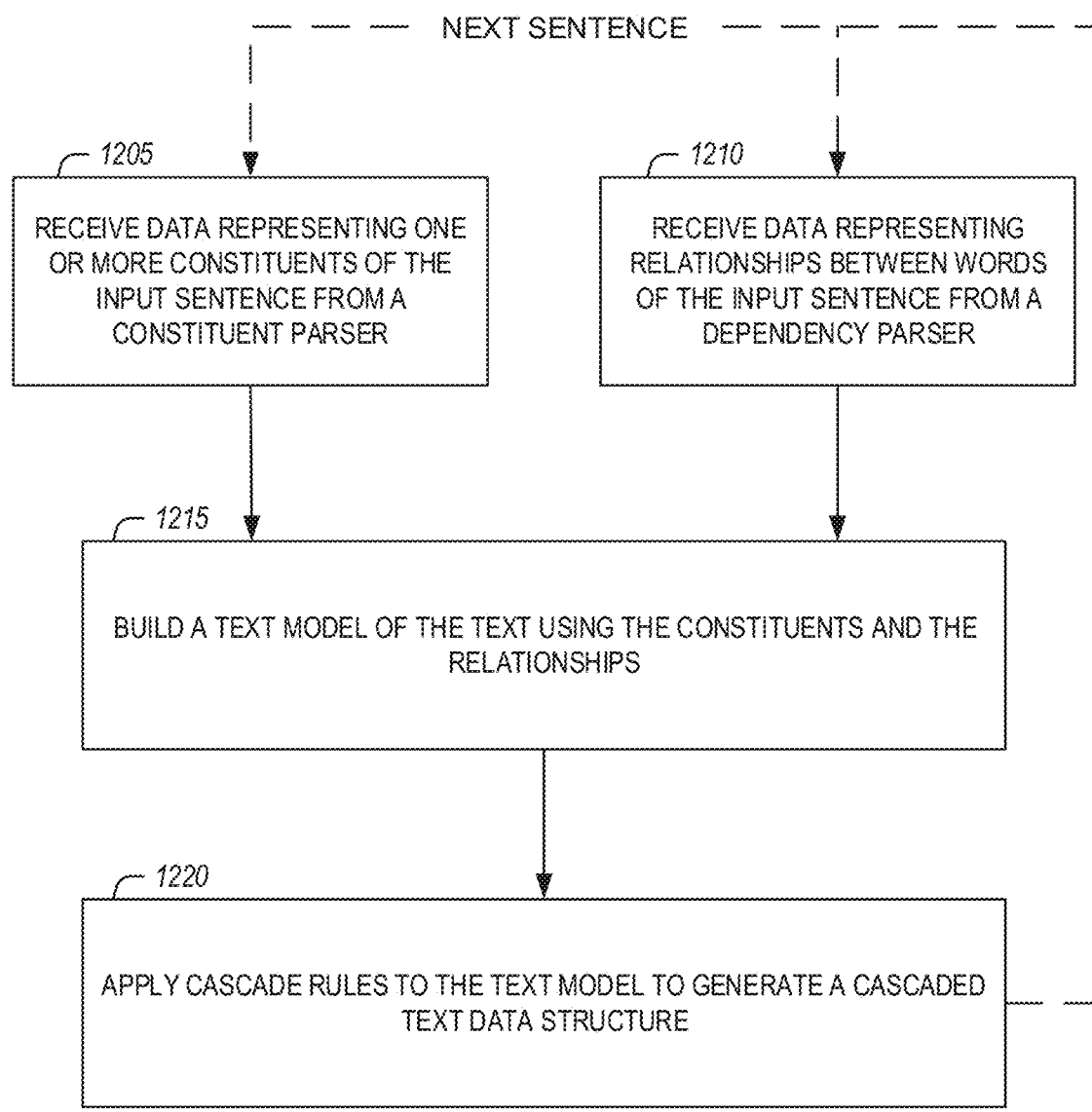
FIG. 12 illustrates an example of a method for linguistically-driven automated text formatting, according to an embodiment.

FIG. 12 illustrates an example of a method 1200 for linguistically-driven automated text formatting, according to an embodiment. The method 1200 may provide features as described in FIGS. 1 to 5, 6A, 6B, and 7-11.

At operation 1205, data representing one or more constituents of the input sentence may be received from a constituency parser (e.g., the constituency parser 1025 as described in FIG. 10, etc.). The data representing one or more constituents may be generated based on an evaluation of the input sentence using the constituency parser. In an example, the constituency parser may identify constituents of the sentence. In an example, a constituent may be a word or a group of words that function as a single unit within a hierarchical structure.

At operation 1210, data representing relationships between words of the input sentence may be received from a dependency parser (e.g., the dependency parser 1035 as described in FIG. 10, etc.). The relationships may be based on the sentence structure and may be derived based on evaluation of the input sentence using the dependency parser. In an example, a dependency may be a one-to-one correspondence so that for an element in the input sentence there is exactly one node in the structure of the input sentence that corresponds to the element.

At operation 1215, a text model may be built (e.g., by the input processor 1015 as described in FIG. 10, etc.) using the constituents and the dependency relationships (as shown in FIG. 6A, etc.) In an example, the text model may be further elaborated by linguistic features produced by additional NLP-Services, including by example but not limitation, coreference information, sentiment tracking, named entity lists, topic tracking, probabilistic inference evaluation, prosodic contours, and semantic analysis.

At operation 1220, cascade rules may be applied (e.g., by the cascade generator 1055 as described in FIG. 10, etc.) to the text model to generate a cascaded text data structure. In an example, the cascaded text data structure comprises text and metadata specifying display parameters for the text. In an example, the cascade text data structure comprises a file (e.g., an extensible markup language (XML) file, etc.) organized according to a schema (e.g., an XML schema, etc.). In an example, the schema comprises a specification for components and arrangement of the components in the file. In an example, the text model may be a data structure that describes constituents and dependencies of words included in the input sentence. In an example, the text model may be a data structure including a parse tree, parts of speech, tokens, constituent chart, and dependencies for the text. In an example, the cascade rules comprise formatting rules that create line breaks and indents defined corresponding to constituents and dependencies.

In an example, metadata may be generated that is associated with the cascaded text. In another example, the cascaded text comprises a set of formatted text segments including line breaks and indents for display on a display device. In some examples, the input sentence of text may be received from a source specified by a user.

In an example of a paragraph or a collection of sentences, the text may be processed before it is provided to the constituency parser or dependency parser to split text into a list of sentences. Each sentence may be processed individually via the constituency parser 1205 and the dependency parser 1210. In an example, the method 1200 is applied to each sentence in the text. For example, sentences may be displayed sequentially with each being cascaded separately, but in accordance with user preferences. In some examples, sentences may be grouped into paragraphs via visual cues other than indentation (e.g., background shading, specialized markers, etc.)

FIG. 13 illustrates an example of a method 1300 for linguistically-driven automated text formatting, according to an embodiment. The method 1300 may provide features as described in FIGS. 1 to 5, 6A, 6B, and 7-12.

The model of the text may be built (e.g., by the input processor 1015 as described in FIG. 10, etc.) from dependency and constituency data obtained by parsing the text (e.g., at operation 1305). The cascade data structure may be generated according to cascade rules applied (e.g., by the cascade generator 1055 as described in FIG. 10, etc.) to a model of the text (e.g., at operation 1310). Sentences of text may be displayed in response to a cascaded text data structure (e.g., at operation 1315). The data structure may specify the horizontal and vertical arrangement of the text for display.

FIG. 14 illustrates an example of a method 1400 for cascading text using a machine learning classifier for linguistically-driven automated text formatting, according to an embodiment. The method 1400 may provide features as described in FIGS. 1 to 5, 6A, 6B, and 7-13.

At operation 1405, a text portion is obtained from an interface. For example, text may be input by a user via an input device, may be obtained from a local or remote text source (e.g., a file, a publisher data source, etc.), etc. At operation 1410, the text portion is processed through NLP services (e.g., NLP Service 730 as described in FIG. 7, etc.) to obtain linguistic encodings. For example, the text may be parsed using a variety of parsers that may include, by way of example and not limitation, a constituency parser, a dependency parser, a coreference parser, etc. to identify constituents, dependencies, coreferences, etc. At operation 1415, a machine learning (ML) classifier is applied to the linguistic encodings to determine a cascade (e.g., by the cascade generator 725 as described in FIG. 7, etc.). For example, the machine learning classifier may use the information identified by the parsers (e.g., portions of the text encoded with the linguistic information identified by the parser(s), etc.) to classify portions of the text for formatting (e.g., line breaks, indentation, etc.). At operation 1420, the cascade is displayed on a user interface in accordance with user preferences. For example, the cascade may be displayed on a screen of a computing device (e.g., standalone computer, mobile device, tablet, etc.) in an application window, web browser, text editor, etc.

Figure 15:
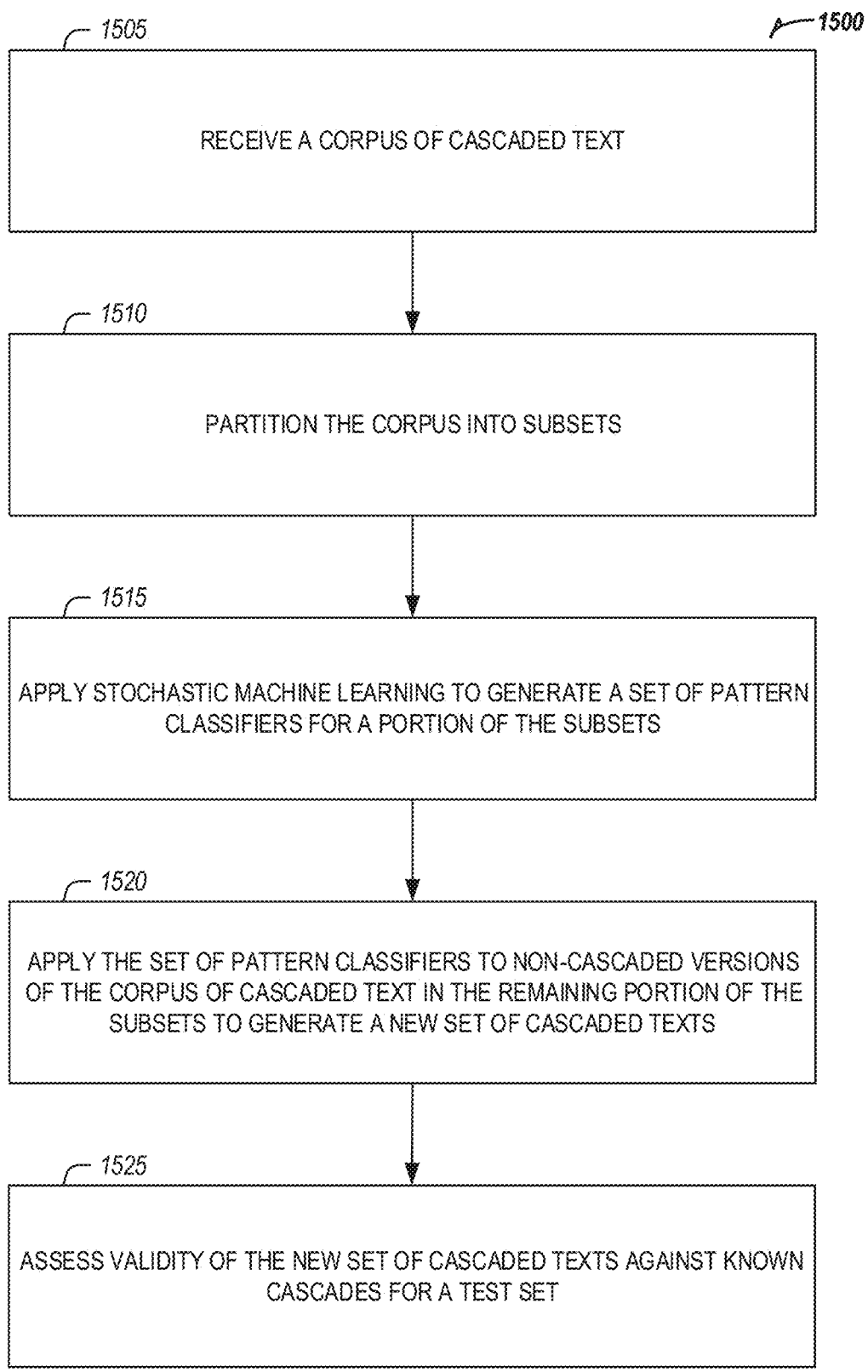
FIG. 15 illustrates an example of a method for training a machine learning classifier to cascade text for linguistically-driven automated text formatting, according to an embodiment.

FIG. 15 illustrates an example of a method 1500 for training a machine learning classifier to cascade text for linguistically-driven automated text formatting, according to an embodiment. The method 1500 may provide features as described in FIGS. 1 to 5, 6A, 6B, and 7-14.

A machine learning service, such as machine learning service 735 illustrated in FIG. 7, is trained with examples of cascades in order to cascade output (e.g., the output 1060 as described in FIG. 10, etc.), as an alternative to using logic and rules defined manually by human effort or via a cascade generator (e.g., the cascade generator 1055 as discussed in FIG. 10, etc.).

At operation 1505, a corpus of cascaded text may be obtained. The corpus is separated into a training set and a test set. At operation 1510, the corpus may be partitioned into subsets. For example, a majority portion of the corpus is designated for training and the remaining portion for validation. At operation 1515, a stochastic machine learning method (e.g., Support Vector Machines with Recursive Feature Elimination, etc.) may be applied to generate a set of pattern classifiers for a portion of the subsets (e.g., the training set, etc.). A cross-validation procedure is performed to evaluate the set of pattern classifiers by applying pattern classifiers to uncascaded examples of sentences in the test set. At operation 1520, the set of pattern classifiers may be applied to non-cascaded versions of the corpus of cascaded text in the remaining portion of the subsets to generate a new set of cascaded texts. Validity of the cascades generated by the classifier set may be assessed with respect to known cascades. At operation 1525, validity of the new set of cascaded texts may be assessed against known cascades for a test set according to accuracy, sensitivity, and specificity. For example, the corpus of cascaded text marked with constituents and dependencies serves as the training set to produce classifier functions that may be used to generate the proper cascade for a particular novel sentence (not in the training set), based on its linguistic attributes. By way of example and not limitation, classifications may be performed using linear kernel Support Vector Machines with Recursive Feature Elimination (SVM-RFE; Guyon et al., 2002). The SVM classification algorithm (Vapnik, 1995, 1999) has been used in a wide range of applications and produces better accuracy than other methods (e.g., Asri et al., 2016; Huang et al., 2002; Black et al., 2015). SVM partitions the data into classes (e.g., cascade patterns) by identifying the optimal separation point (hyperplane) between two classes in a high dimensional feature space, such that the margin width around the hyperplane is maximized and misclassification errors are minimized. The closest cases to the hyperplane are called support vectors, and these serve as critical identifiers for distinguishing between classes. A cross-validation (CV) approach is utilized to assess the generalizability of the classification model (e.g., Arlot & Celisse, 2010; James, Witten, Hastie, and Tibshirani, 2013). This involves partitioning the data into subsets, or folds, (10 is used following convention, which is referred to as 10-fold CV), with 9 used for classifier training and the held-out set used to validate the resultant classifiers.

Cross-validation is performed using a multi-level method to validate generalizability of our classifiers across i) cases (sentences); ii) features (e.g., syntactic categories or dependencies), iii) and tuning parameters (optimization). This method protects against overfitting and avoids biased estimates of classification accuracy that may derive from using the same CV subsets to evaluate more than one aspect of the classifier simultaneously. Outcomes of each CV procedure are assessed using measures of specificity=TN/(TN+FP), sensitivity=TP/(TP+FN), and accuracy=(sensitivity+specificity)/2, where TN is the number of true negatives, FP is the number of false positives, TP is the number of true positives, FN is it the number of false negatives.

It may be understood that a variety of machine learning techniques may be used to train the classifiers to recognize cue insertion points and cue formatting using labeled or unlabeled data. Machine learning techniques that are consistent with observing and learning from the labeled data or from inherent coding based on positional structure of the training cascade corpus may be used to facilitate training of the classifiers. Thus, SVM is used as an example to further inform the training process, but it will be understood that alternative machine learning techniques with similar functionality may be used.

The process may be applied with a training set generated via alternative means and is not dependent on the cascade generator. For example, hand coded training data, etc. may be used to train ML models to generate cascaded text.

In an example, The NLP services referred to herein may use a pre-trained AI model (e.g., AMAZON@ Comprehend or Stanford Parser (https://nlp.stanford.edu/software/lex-parser.shtml), GOOGLE® Natural Language, or MICROSOFT@ Text Analytics, AllenNLP, Stanza, etc.) that may use an RNN for text analysis. Given larger amounts of data, the RNN is able to learn a mapping from free text input to create output such as predicted entities, key phrases, parts of speech, constituent charts, or dependencies etc. that may be present in the free text. In an example, additional machine learning models may be trained using key-phrase-format-rule, part-of-speech-format-rule, entity-format-rule pairs, constituency data, dependency data, etc. as training data to learn to identify various parts of speech, key phrases, entities, constituencies, dependencies, etc. that may then be used in future parse operations. In another example, user preference and parts of speech, key phrase, entity pairs, constituencies, dependencies, etc. may be used to train a machine learning model to identify user preferences based on various parts of speech, key phrases, and entities. The various machine learning models may provide output based on a statistical likelihood that a given input is related to a selected output. For example a recurrent neural network including various threshold layers may be used to generate the models to filter outputs to increase the accuracy of output selection.

The cascaded output may be presented to the user in a variety of mediums. For example, a side-by-side display of the original text and the cascaded text may be displayed on a display device, the original text may be replaced or modified with the cascade output, etc.

In an example, machine learning may be used to evaluate a corpus of cascaded text to learn cascade pattern classifiers for linguistically-driven automated text formatting. Pattern classifiers specify the actual visual cues (e.g., cascading, indentation, ling breaks, color, etc.) that signal linguistic attributes contained in the text segment, according to the style of the cascade rules. In an example, the classifiers may evaluate the words, parts of speech, constituent groups or dependency labels of a text segment and produce a formatting structure consistent with the visual cues present in the cascade training set. In an example, the classifiers may evaluate the shape and display properties of the cascades in the training set directly and produce a formatting structure consistent with the visual cues present in the training set.

Figure 16:
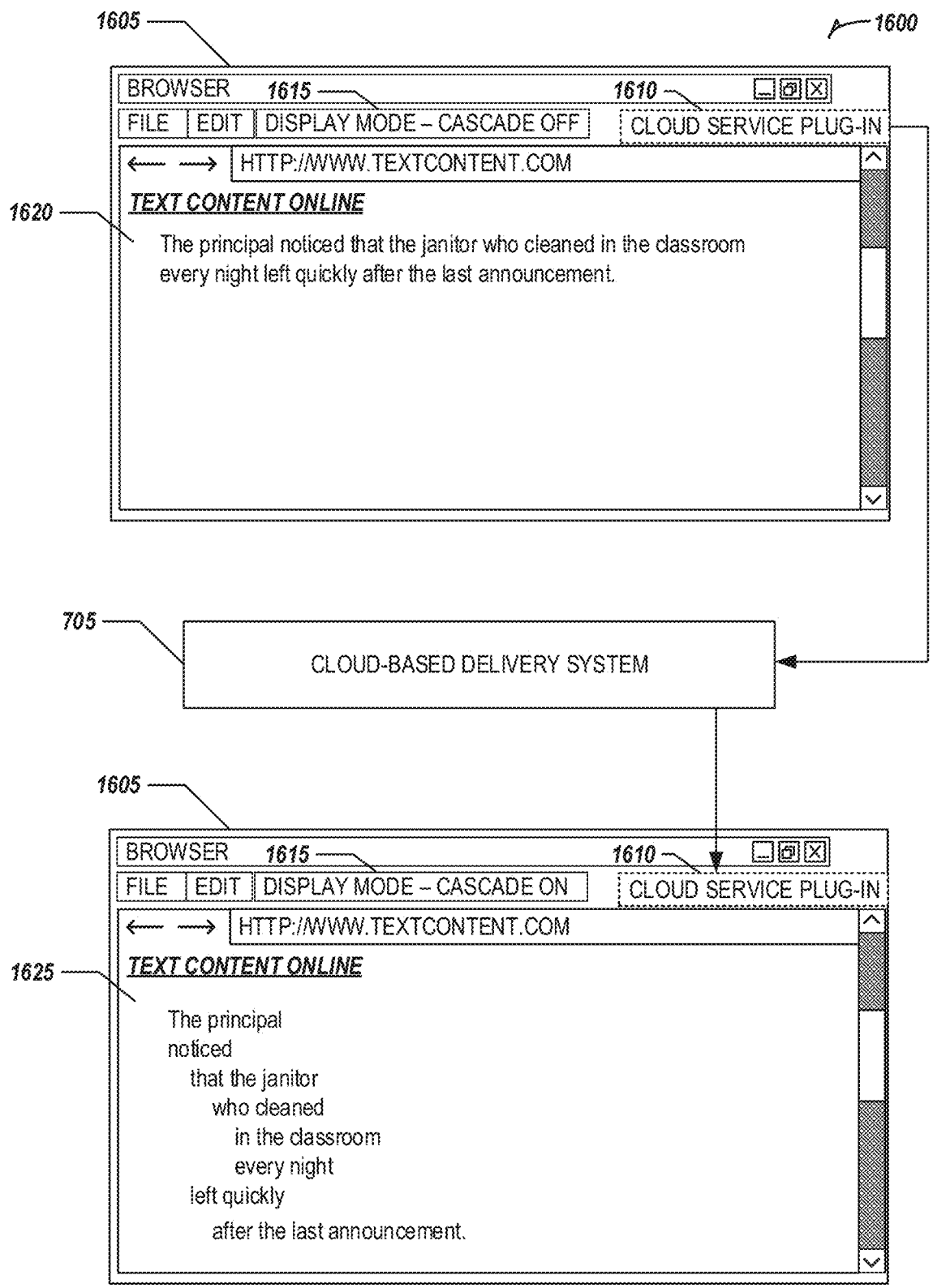
FIG. 16 illustrates an example of text transformation for displaying sentences of in a cascaded format for linguistically-driven automated text formatting, according to an embodiment.

FIG. 16 illustrates an example of text transformation 1600 for displaying sentences of text in a cascaded format for linguistically-driven automated text formatting, according to an embodiment, in accordance with an embodiment. The text transformation 1600 may provide features as described in FIGS. 1 to 5, 6A, 6B, and 7-15. A browser window 1605 may include a plug-in 1610, that is connected to the system 1605, and a cascade mode button 1615 when the cascade mode is off, standard text 1620 may be displayed when a user views text on a website. When the cascade mode is on, the text may be formatted and displayed in cascade format 1625.

Figure 17:
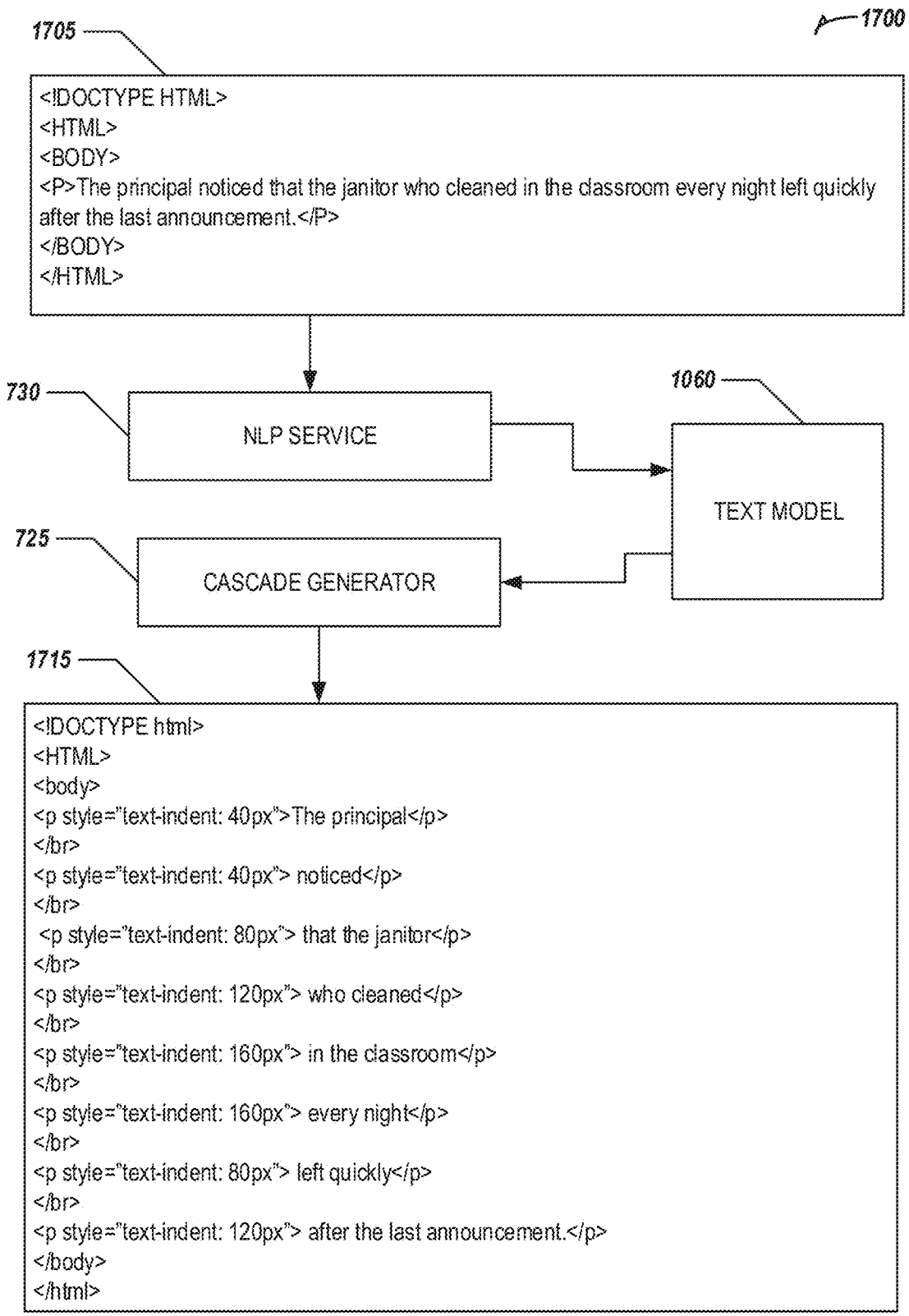
FIG. 17 illustrates an example of a parse structure for hypertext markup language (HTML) code tagged for cascaded text using natural language processing for linguistically-driven automated text formatting, according to an embodiment.

FIG. 17 illustrates an example 1700 of a hypertext markup language (HTML) code tagged for cascaded text for linguistically-driven automated text formatting, according to an embodiment. The example 1700 may provide features as described in FIGS. 1 to 5, 6A, 6B, and 7-16. Source text 1705 may be processed by the NLP service 730 as described in FIG. 7 to produce a text model 1050 (e.g., part-of-speech, key phrases, constituency data, dependency data, etc.). While the example shows the source text 1705 as HTML code, the text may be in ASCII format, XML format, or a variety of other machine-readable formats. The cascade generator 725 as described in FIG. 7 may render tagged output text 1715 that indicates line breaks (e.g., as </br> tags in HTML code, etc.) and indentation (e.g., using the text-indent: tag in HTML, etc.) inserted into the text based on the text model 1050.

The cascade generator 725 may make several calls to the NLP service 730 for multiple functions, such as described herein with respect to constituents and dependencies, or other linguistic data. In one embodiment, each of these is a separate call/function which, when combined, provide the set of tags to be used for to generate cascaded text.

OTHER EMBODIMENTS

Returning to the description of FIG. 7, according to one example embodiment, key phrases, constituents, dependencies, etc. may be determined in a probabilistic manner by the NLP service 730 using computational linguistics. The cascading text generated by the cascade generator 725 may improve reading comprehension. According to an example embodiment, the constituents that describe the who, when, where, and what information in a sentence, are separated via line breaks and/or indentation to achieve a cascaded text format. The cascade generator 725 uses the constituents, which are linked to dependencies, etc. to determine who, when, where, and what of a sentence. For example, indentations inserted by the cascade generator 725 is based on sentence constituency hierarchy informed by the NLP service 730.

Continuous improvement of cascade formatting may be achieved by employing artificial intelligence including machine learning techniques via the machine learning service 735. The inputs/outputs to and from the machine learning service 735 may be processed actively and passively. For example, the machine learning service 735 may operate under an active machine learning approach in an example where two users may be reading the same material with a slightly different cascade format between person A and B. The reading comprehension by the users of the material may be tracked via assessments and the machine learning service 735 may generate outputs that may be used by the cascade generator 725 to modify the display properties over time. This approach allows for the system 705 to improve with scale and usage. The machine learning service 735 may operate in a passive mode to measure attributes like reading behavior without an explicit assessment. For example, the analytics service 740 may collect data that (singly and when combined) may be used to generate output indicative of reader comprehension without the user taking an assessment. Some of the data that may be evaluated to refine cascade formatting may be, by way of example and not limitation, time spent reading a given portion of text (e.g., less time spent reading may indicate higher comprehension, etc.), eye tracking using cameras (e.g., embedded cameras, external, etc.) that evaluate efficiency of eye movement across different cascade formats of the same content to provide machine learning input, and user modification to evaluate the degree of personal modification for user preferences (e.g., more spacing, sentence fragment length, font, color enhancement of key phrases or part-of-speech, constituents, dependents, etc.).

The analytics service 740 may log and store user analytics including measures of reading comprehension, user preferences as reflected in modifications to the system (e.g., scrolling speed, spacing, fragment length, dark mode, key phrase highlighting, etc.), etc. The modifications may be evaluated for various cascade formats to determine how various modifications translate into comprehension performance and may be fed into the machine learning service 735 as input to improve default display formats. The user profile service 745 may store user profile data including an anonymized identifier for privacy and privacy compliance (e.g., HIPPA compliance, etc.), and may track performance metrics and progress. For example, modifications to display parameters that are continually made by the user may be learned by the machine learning service 735 based on input from the analytics service 740 and may be used to generate user-specific display properties. The access control service 750 may provide access to stored content including metrics on frequency, time of use, and text attributes (e.g., fiction, non-fiction, author, research, poetry, etc.). According to another personalization, a user may personalize display parameters such as text color, font, font size, and other display parameters.

In an example, a reading score may be developed for a user. A scoring matrix may be created that may be based on a student's age and grade that may be a result of their reading of specified content and then their associated comprehension (e.g., a Reading Comprehension Score (RCS), etc.). The RCS approach is analogous to grade point average (GPA) in establishing a relative scoring metric amongst similar cohorts. The metric may be based on evaluation of consumption of text by the user using cascade formatting. For example, an assessment may be tracked over time-actively or passively-to determine speed and efficiency of the comprehension of the text by the user. A score may be calculated for the user that increases with speed of comprehension. Inputs received before performing a reading assessment may be used to generate a baseline quotient for the user.

A cognitive training library may be developed using cascade formatting. For example, various published content items such as books, magazines and papers may be translated using the cascading format and users may be allowed to access the library for purposes of training their brains to increase comprehension and retention. Tests and quizzes may be used to assess performance of comprehension of the user to provide the user with tangible evidence of cognitive improvement.

Cascade formatting may be applied to process a variety of languages. An NLP Service(s) may be used to provide linguistic features of the other language text and rules may be created and applied to the NLP output (e.g., Spanish text, etc.) to cascade foreign language text accordingly. In addition to language adaptations, adaptations may be made based on syntax of other languages and thus the cascaded text for a different language may cascade in a different format using different formatting rules to account for language-specific syntactic variations. Constituency and dependency NLP services are available in multiple languages. Because the cascade rules are based on a universal dependency set, there is a high likelihood that the cascade rules will transfer to other languages, although the output may look different (e.g., some languages read right to left instead of left to right, top to bottom, etc.) Some will have different length words that may require different types of line breaks (e.g., agglutinative languages add grammar by appending morphemes, resulting in very long words). etc. Display properties are applied that are adapted to the language, but the process of Constituent Cuing as discussed herein remains constant.

In an example, spoken words may be combined with visual display of the cascade formatted text. Sound may be integrated such that as one is reading cascading text there is also a soundtrack of reading the same text, played at a controllable speed to match the individual reader's speed. For example, text-to-speech may be used to provide the audio/speech output in real time and reading pace and comprehension may be evaluated and speed of the text-to-speech output may be altered (e.g., sped up, slowed down, paused, resumed, etc.) to keep the audio synchronized with the reading of the user. The cascade may be accompanied by speech in such a way that the reader may visually perceive the prosodic cues associated with line breaks. This didactive system may be used to tutor the user so that his/her own oral reading mimics this prosody. This will in turn support increased knowledge of syntactic structures.

FIG. 18 illustrates an example 1800 of generating cascaded text from a captured image for linguistically-driven automated text formatting, according to an embodiment. The example 1800 may provide features as described in FIGS. 1 to 5, 6A, 6B, and 7-17. An imaging device 1805 may capture an image including text 1810. The image may be processed (e.g., via optical character recognition, etc.) to extract the text 1810 from the image. The text 1810 may be evaluated via the system 1000 to identify a text model (e.g., based on constituencies, dependencies, etc.) in the text. Cascade formatting rules may be applied to the text 1810 based on linguistic attributes assigned via system 1000. The text 1810 may be converted via cascade formatting rules to cascaded output text and displayed for consumption by a user.

Figure 19:
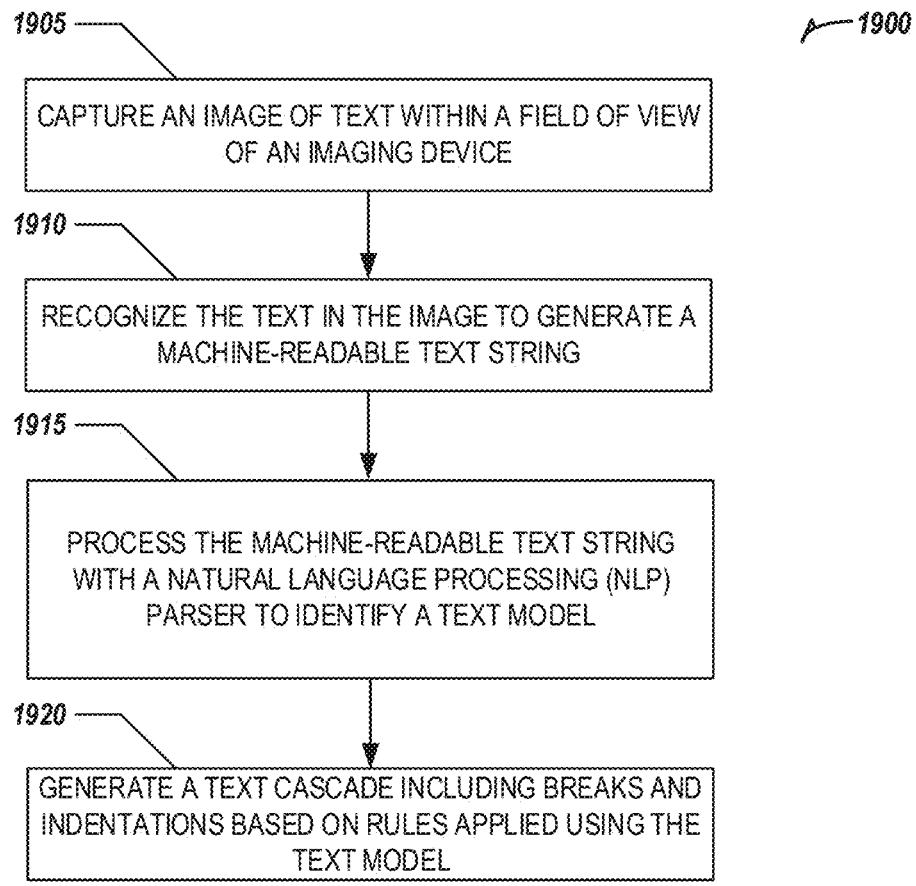
FIG. 19 illustrates an example of a method for generating cascaded text from a captured image using natural language processing for linguistically-driven automated text formatting, according to an embodiment.

FIG. 19 illustrates an example of a method 1900 for generating cascaded text from a captured image for linguistically-driven automated text formatting, according to an embodiment. The method 1900 may provide features as described in FIGS. 1 to 5, 6A, 6B, and 7-18. At operation 1905, an image of text may be captured within a field of view of an imaging device. At operation 1910, the text may be recognized in the image to generate a machine-readable text string. At operation 1915, the machine-readable text string may be processed with NLP Services to identify linguistic attributes (e.g., part-of-speech, lemma, constituency data, dependency data, coreference data, sentiment analysis, topic tracking, probabilistic inference, and prosodic structure, etc.) to generate a text model (e.g., as shown in element 1050 of FIG. 10, etc.). At operation 1920, a text cascade may be generated that includes breaks and indentations based on rules applied using the text model. In an example, the text string may contain sentences of text, and the breaks and indentations may be applied to the sentence. In an example, the text string may include multiple sentences, grouped into paragraphs via visual cuing (e.g., background color, explicit markers, etc.).

Figure 20:
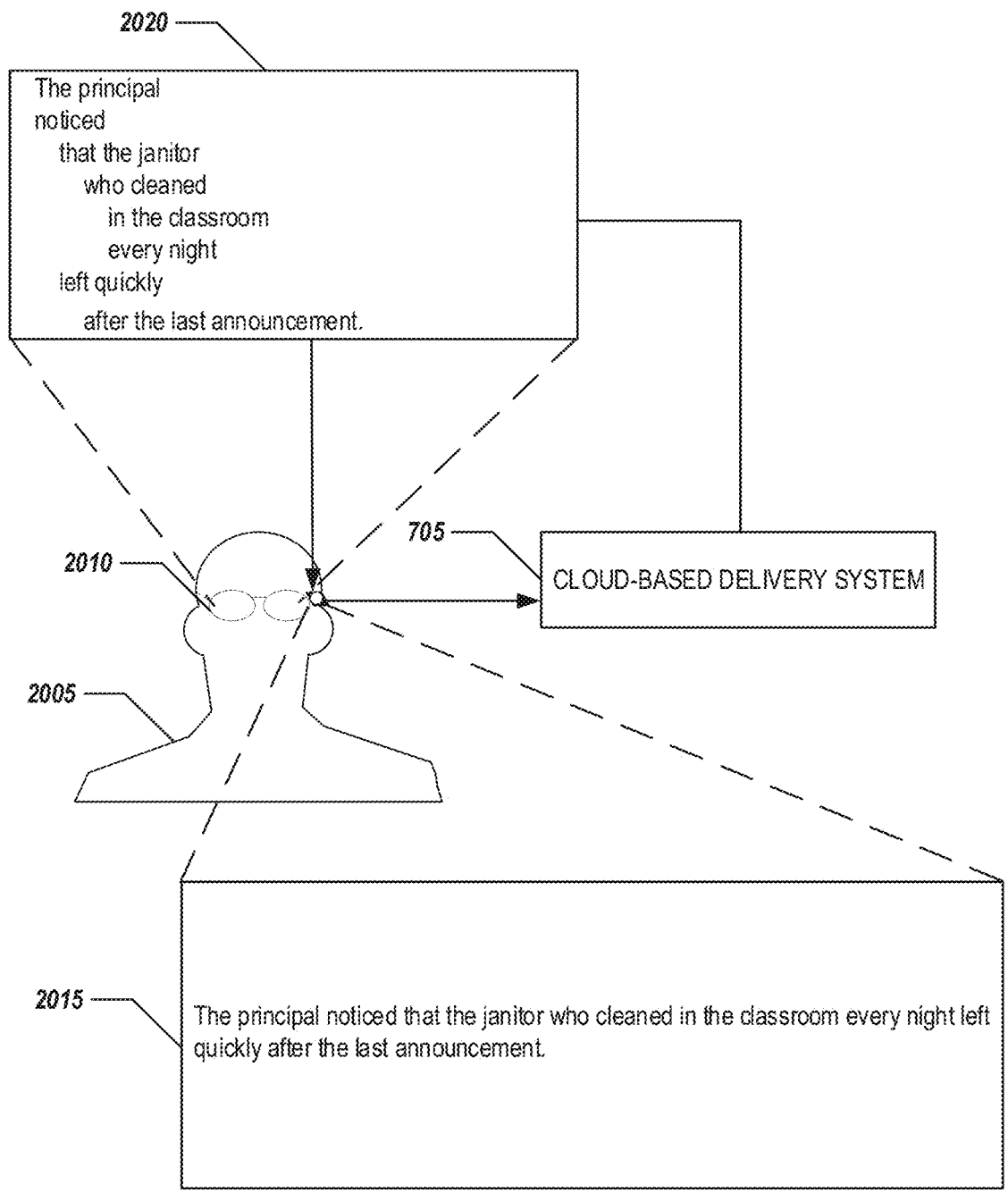
FIG. 20 illustrates an example of converting text from a first display format to a second display format in an eyewear device using natural language processing for linguistically-driven automated text formatting, according to an embodiment.

FIG. 20 illustrates an example 2000 of converting text from a first display format to a second display format in an eyewear device using natural language processing for linguistically-driven automated text formatting, according to an embodiment. The example 2000 may provide features as described in FIGS. 1 to 5, 6A, 6B, and 7-19. A user 2005 may be wearing smart glasses that include an imaging device 2010. The imaging device 2010 may capture an image including text 2015. The image may be processed (e.g., via optical character recognition, etc.) to extract the text 2015 from the image. The text 2015 may be evaluated via the system 705 to identify linguistic attributes (e.g., part-of-speech, key phrases, constituency data, dependency data, etc.) in the text (e.g., to form a model 1050 as described in FIG. 10, etc.). Cascade formatting rules may be applied to the text 2015 using the linguistic attributes identified (e.g., such as the model 1050 as described in FIG. 10, etc.) by the cloud-based delivery system 705. The text 2015 may be converted to cascaded output text 2020 and displayed on a display device of the smart glasses that include an imaging device 2010 for consumption by a user.

Figure 21:
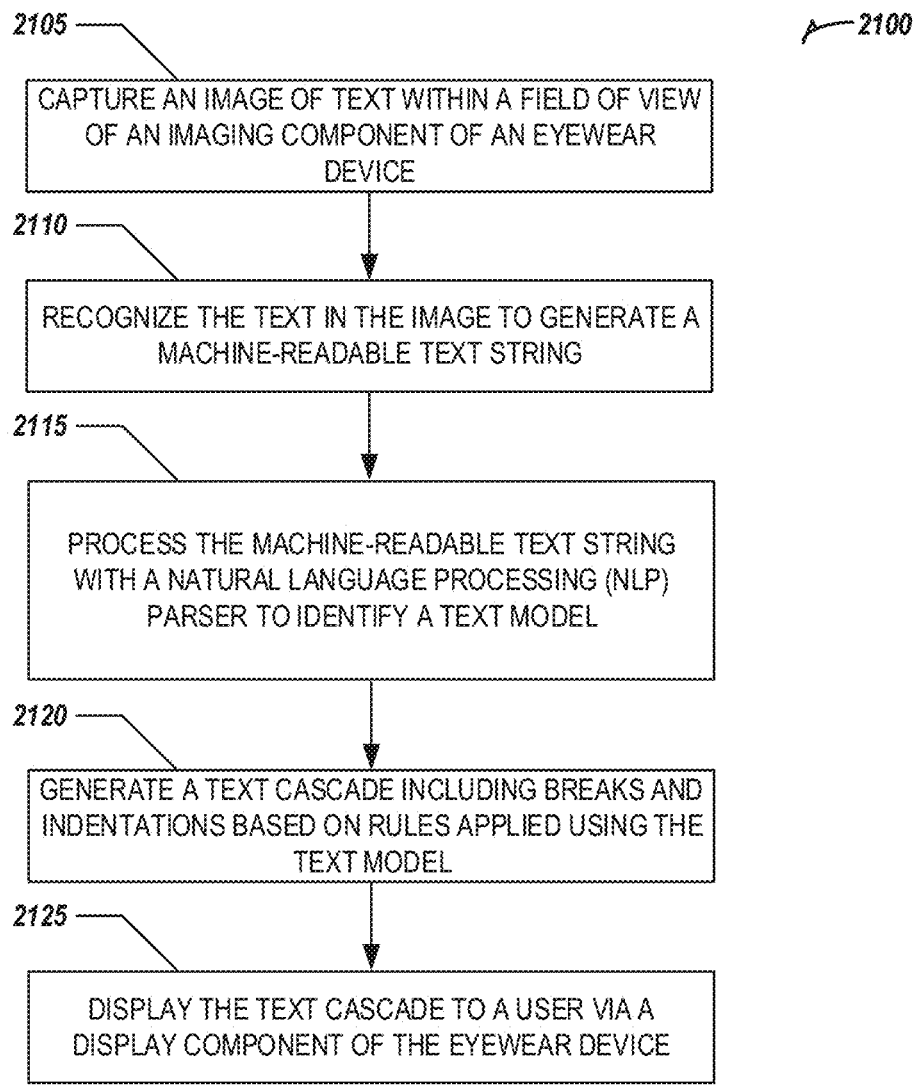
FIG. 21 illustrates an example of a method for converting text from a first display format to a second display format in an eyewear device using natural language processing for linguistically-driven automated text formatting, according to an embodiment.

FIG. 21 illustrates an example of a method 2100 for converting text from a first display format to a second display format in an eyewear device for linguistically-driven automated text formatting, according to an embodiment. The method 2100 may provide features as described in FIGS. 1 to 5, 6A, 6B, and 7-20. At operation 2105, an image of text may be captured within a field of view of an imaging component of an eyewear device or from another source of text input. In an example, the eyewear device may have memory in which the text is stored or downloaded as a file, may have a wireless capacity whereby the text is wirelessly acquired and then converted, etc. At operation 2110, the text may be recognized in the image to generate a machine-readable text string. At operation 2115, the machine-readable text string may be processed with NLP Services 1020 to identify linguistic attributes (e.g., part-of-speech, lemma, constituency data, dependency data, coreference data, sentiment analysis, topic tracking, probabilistic inference, and prosodic structure, etc.) and generate a text model (e.g., the model 1050 as described in FIG. 10, etc.). At operation 2120, a text cascade may be generated that includes breaks and indentations based on rules applied using the text model 1050. In an example, the text string may contain sentences of text, and the breaks and indentations may be applied to the sentence. In an example, the text string may include multiple sentences, grouped into paragraphs via visual cuing (e.g., background color, explicit markers, etc.). At operation 2125, the text cascade may be displayed to a user via a display component of the eyewear device.

Figure 22:
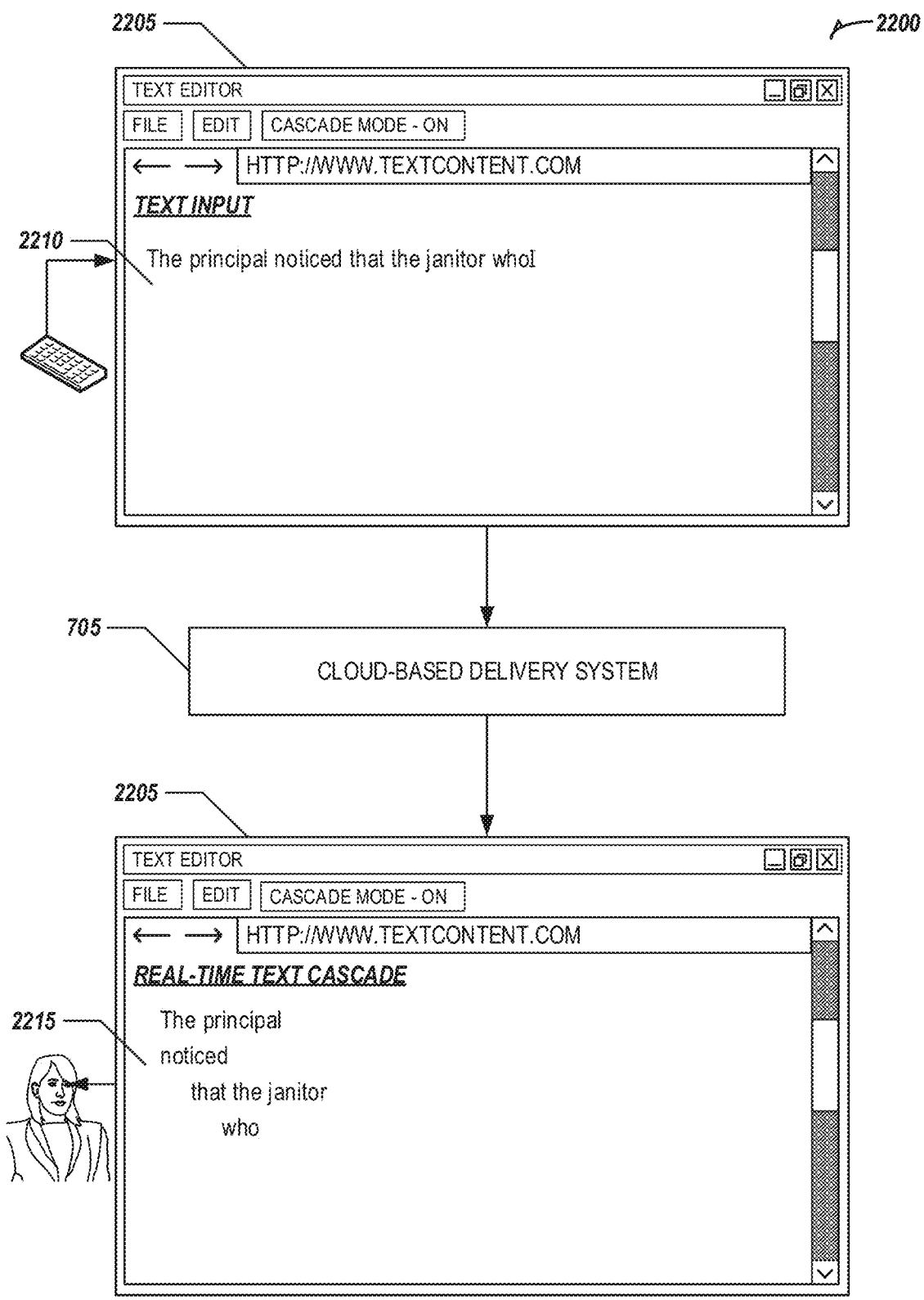
FIG. 22 illustrates an example of generating cascaded text using natural language processing as text is authored for linguistically-driven automated text formatting, according to an embodiment.

FIG. 22 illustrates an example 2200 of generating cascaded text for linguistically-driven automated text formatting, according to an embodiment. The example 2200 may provide features as described in FIGS. 1 to 5, 6A, 6B, and 7-21. A text authoring tool 2205 may receive text input 2210 from a user (e.g., via a keyboard, voice command, etc.). As the text input 2210 is received, it is processed by the system 705 (via online connection, locally available components, etc.) to identify linguistic attributes (e.g., part-of-speech, constituency data, dependency data, etc.) in the text input

2210. In an example, the system 705 (or components of the system 705) may be executing on a remote computing platform or may be executing on a device on which the text authoring tool 2205 is executing. Cascade formatting rules may be applied to the input text 2210 using the linguistic attributes identified in the input text 2210. The displayed output text 2215 may be displayed as cascaded output text as the user enters the text to provide the user with real-time cascade formatting as text is entered.

Figure 23:
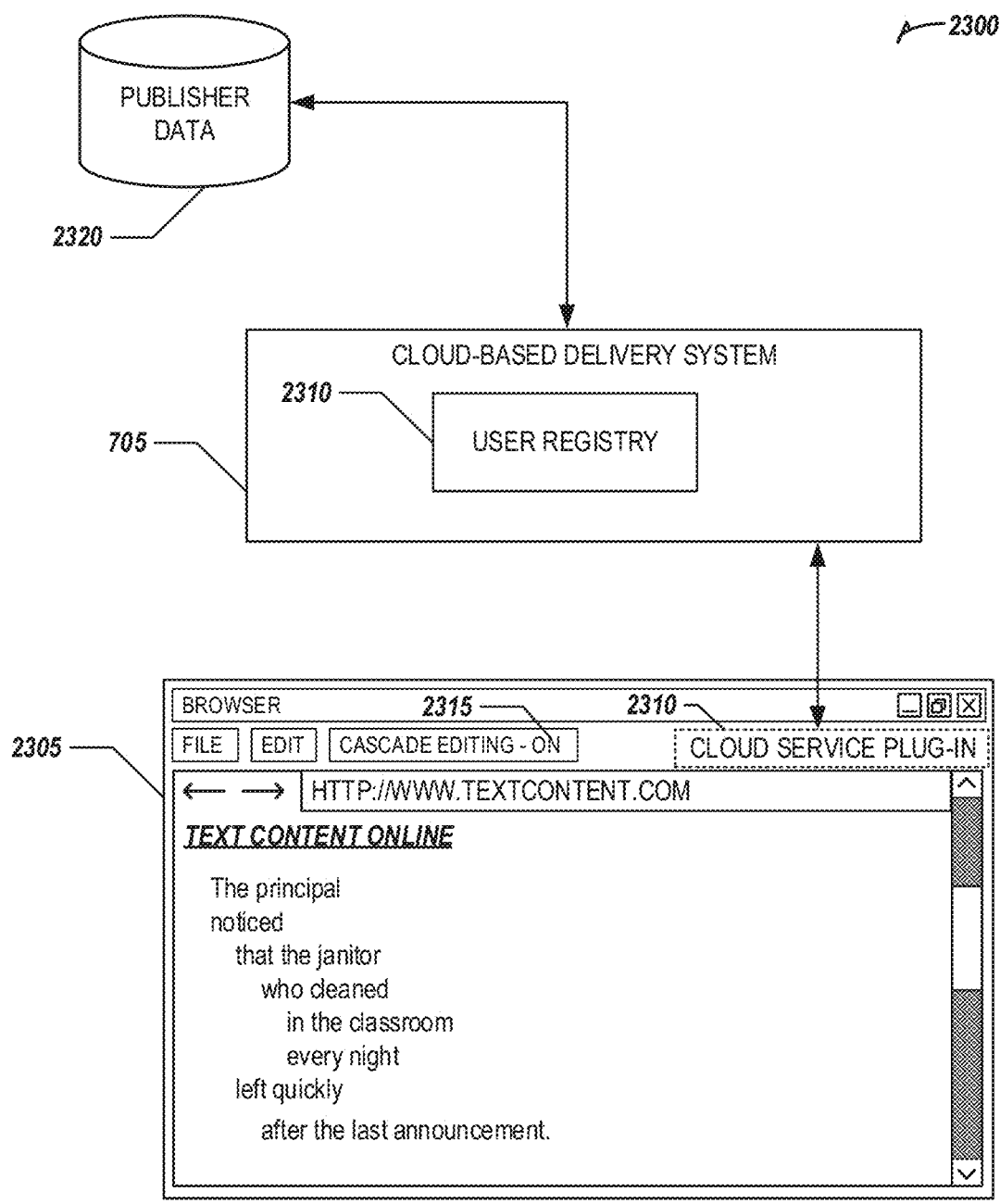
FIG. 23 illustrates an example of an architecture for user and publisher preference management of cascaded text using natural language processing based on feedback input for linguistically-driven automated text formatting, according to an embodiment.

FIG. 23 illustrates an example of an architecture 2300 for user and publisher preference management of cascaded text using natural language processing based on feedback input for linguistically-driven automated text formatting, according to an embodiment. The architecture 2300 may provide features as described in FIGS. 1 to 5, 6A, 6B, and 7-19. The user interface 2305 and the plug-in 2310 may connect to the system 705 as described in FIG. 7. The system 705 may include a user registry 2310 that may allow users and publishers to register to publish and consume text via the system 705. The user registry may maintain profiles for users and publishers that includes display preferences to be applied when viewing cascaded text. The user preferences do not change the formation of the cascaded text, but may provide user or publisher defined display modifications such as text color, font size, line spacing, etc. A cascade mode button 2315 may be provided that allows a user to turn editing mode on or off. Text may be displayed in a cascade format and when the cascade editing mode is enabled, changes to the cascade display properties may be tracked and may be evaluated to generate personalized cascade display properties for the user. Tracked changes may be used as feedback information stored in a profile that may be used to learn user preferences over time. The feedback may also be direct input provided by a user or publisher indicating preferences for content display properties.

In an example, a publisher may register via the user registry 2310 and may provide published content for consumption by users of the system 705. Publisher data 2320 may include content including books, magazines, manuals, exams, etc. that may be input into the system 705. Linguistic attributes (e.g., part-of-speech, constituency data, dependency data, co-reference linking, etc.) may be identified for each sentence in the publisher data 2320 by an NLP Service(s), which will classify words or combinations of words as a named entities, part-of speech, having a constituency relationship, having a dependency relationship, coreference and topic links, etc. The publisher data 2320 including the linguistic analysis may be received by the system 705.

The identified linguistic attributes of the publisher data 2320 may be evaluated against a set of cascade formatting rules that may include rules for inserting line breaks, indentation, and other formatting elements. The cascade formatting rules may be triggered by a class or part-of-speech, key phrase, type of constituent or dependency, etc. as identified in text. The cascaded publisher data may be provided back to the publisher to be included in the publisher data 2320 and may be consumed by a user via the user interface 2305.

Additional formatting may be used to provide further cuing for a user. For example, constituent structure highlighting may be provided to reduce the cognitive load of reading. This allows the systems and methods discussed herein to provide a system that simplifies the reading task. A variety of modifications including modifying text with color, underline, highlight, etc. may be applied to aid in reducing the cognitive load on the user.

Figure 24:
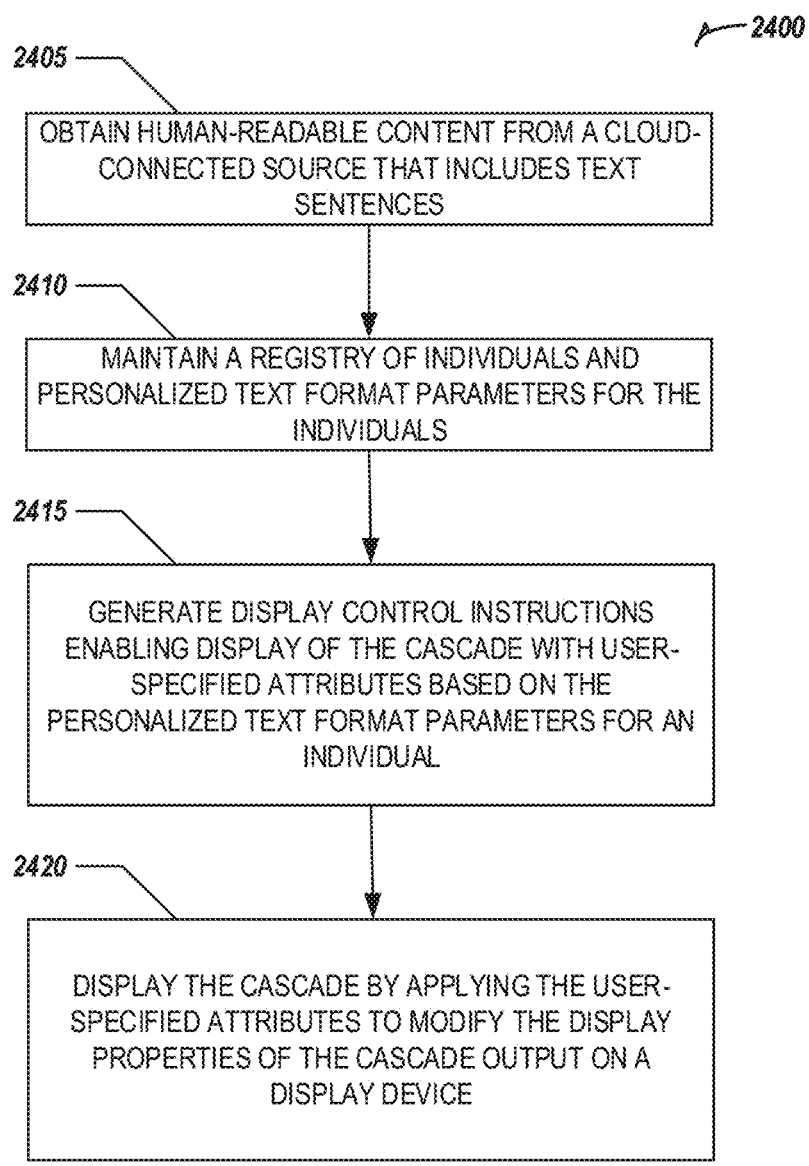
FIG. 24 illustrates an example of a method for personalization of cascaded text using natural language processing based on feedback input for linguistically-driven automated text formatting, according to an embodiment.

FIG. 24 illustrates an example of a method 2400 for personalization of cascaded text using natural language processing based on feedback input for linguistically-driven automated text formatting, according to an embodiment. The method 2400 may provide features as described in FIGS. 1 to 5, 6A, 6B, and 7-23. The systems and methods discussed herein may be used to develop a personalized algorithm that is unique to an individual. People have different ways of processing textual information and a personal reading algorithm (PRA) may be created that is optimized for each person. Text may be displayed in a cascade format and when the cascade editing mode is enabled, changes to the display properties of the cascade formatted output may be tracked and may be analyzed to recognize a medical condition, cognitive function, learning disability, and/or generate personalized cascade format rules for the user. By tweaking various attributes and assessing comprehension and ease of reading, a personalized setting may be developed that is used to customize display properties. This may be created by parameter changes of the display properties made by the user to fit their reading preferences. User adjustments to display properties that may be tracked may include modification of the amount of indentation, highlighting or coloring of key constituents, scrolling speed, etc. While the cascade logic remains based on the linguistic information, the profile of a user may be used to highlight, italicize, colorize, increase spacing, add line returns, and the like in the display properties of the cascaded text.

Like variations between two eyeglass prescriptions, different eyes process information slightly differently which may result in different display properties for two users. Cognitive diversity (e.g., the different ways people confront and process text) may also be addressed by optimizing display properties person-to-person or between groups sharing similar cognitive profiles e.g. ADHD, dyslexia, autism, etc.

For example, reading profiles may be created (standalone or in combination) that modify the presentation parameters based on reader attributes. Contextual profiles may be informed by user input or through computer-automated evaluation such as, for specific medical and cognitive conditions (e.g., dyslexia, attention deficit and hyperactivity disorder (ADHD), attention deficit disorder (ADD), etc.), autism, native languages (e.g., a native Chinese speaker may benefit from a different format than a native Spanish speaker, etc.), the nature of content being read (e.g., fiction, non-fiction, news, poetry, etc.), or screen modes (e.g., phone, tablet, laptop, monitor, AR/VR device, etc.). Display property optimization of cascade output may also be used in a diagnostic and therapeutic manner to address injuries and disabilities. An important symptom in people suffering from concussions or traumatic brain injuries (TBI) is a change in eye movement and tracking. Athletes may be seen on the sidelines being asked to track a finger being moved horizontally in front of them as one example. Reading is taxing on a concussed brain. People suffering from TBI need to take frequent breaks to let their brain rest and heal. In the military and many sports, participants are required to do baseline cognitive testing in order to assess future injuries. In an example, the systems and techniques discussed herein may be used in conjunction with augmented reality headsets/glasses to measure comprehension level baselines using cascaded text and tuned display properties for the participant. This baseline may include eye tracking information in addition to a comprehension assessment and user-reported comfort/strain.

Once that baseline is established, eye tracking and comprehension may be measured using the cascade and the degree to which changes in display properties from baseline settings offer relief. For example, if a baseline measure says the participant reads with a three character indentation and scores a comprehension level of X, then it may be determined how they do with those same measures after a TBI and how they may improve with a modified display with enhanced indentation, colors, etc. The display property changes necessary to support the injured participant may inform their diagnosis and treatment plan. In an example, a user may set their own personal parameters and output formats (e.g., length, spacing, highlighting, indentation, line returns, etc.), font, color, size, background color.

At operation 2405, content (e.g., text, images, etc.) may be obtained from a cloud-connected source that includes text sentences. At operation 2410, a registry of individuals and personalized text format parameters may be maintained for the individuals. In an example, the text formatting parameters may include rules to generate a cascaded text display format personalized for an individual. At operation 2415, display control instructions may be generated that enable display of the cascade with user-specified attributes based on the personalized text format parameters for an individual. For example, a sentence of text may be received from a publishing source associated with an individual from the registry and display control instructions may be generated to control display of the sentence on a client device. At operation 2420, the cascade may be displayed by applying the user-specified attributes to modify the display properties of the cascade output on a display device. The display control instructions may use the personalized text format parameters for the individual and the instructions may enable the display of the sentence in a cascaded format personalized for the individual. In an example, the cloud-connected source may be a browser application, and the browser application may supply the sentence of text to the text processing engine.

Figure 25:
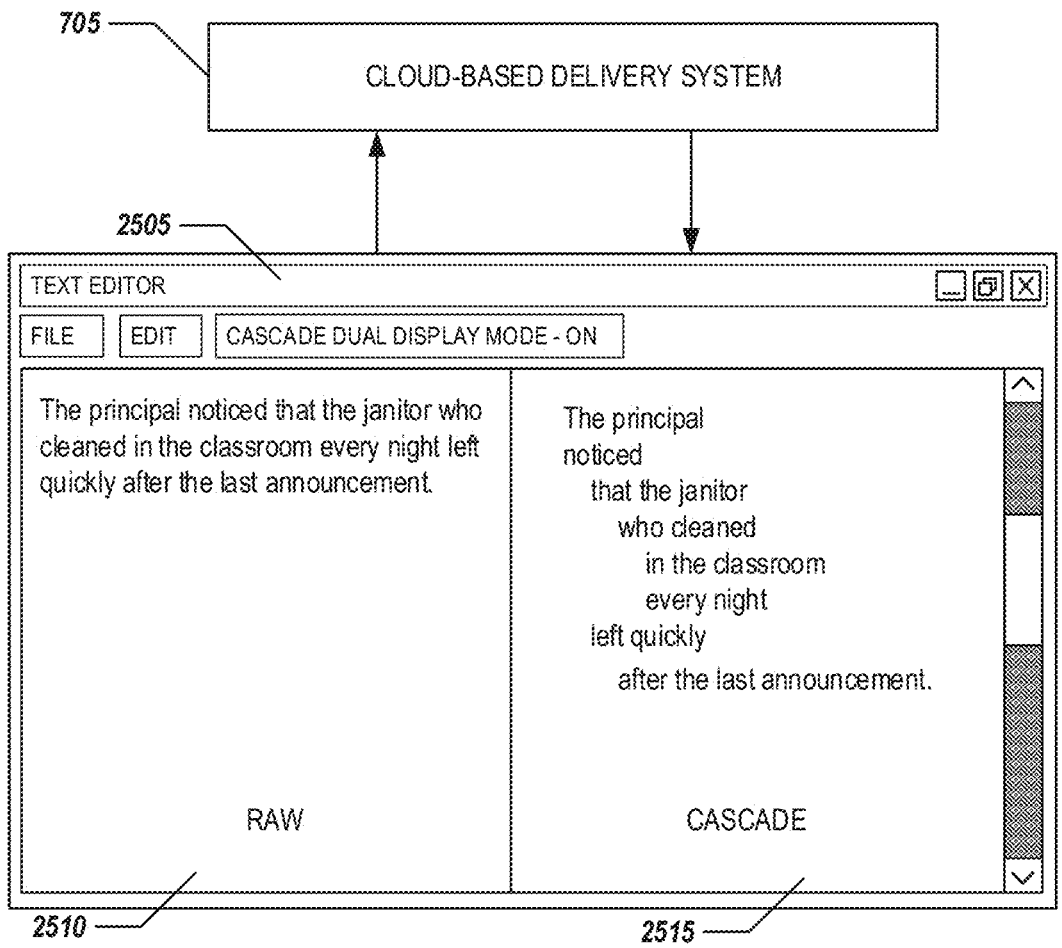
FIG. 25 illustrates an example of dual display of cascaded text using natural language processing based on feedback input for linguistically-driven automated text formatting, according to an embodiment.

FIG. 25 illustrates an example 2500 of dual display of cascaded text based on feedback input (e.g., user modification of the displayed text, etc.) for linguistically-driven automated text formatting, according to an embodiment. The example 2500 may provide features as described in FIGS. 1 to 5, 6A, 6B, and 7-24. Text may be received via a user interface 2505. The text 2510 may be processed by the system 705 to identify parse structure (e.g., part-of-speech, constituency data, dependency data, etc.). The text 2510 (e.g., non-cascaded, original language, cascaded, etc.) or source text may be displayed in a first window of the user interface 2505. While block text is used as an example, the raw text may have html-enhancements, including titles, headings, figure captions, etc. Modified text 2515 may be displayed in a second window of the user interface 2505. The modified text 2515 may be text that has been cascade formatted, translated, formatted in a different cascade format that may include user preferences, etc. In an example, the modified text 2515 may be presented in a cascade format using line breaks and indentations from cascade formatting rules applied using the identified linguistic attributes. The modified text 2515 may be presented with the part-of-speech, constituency data, dependency data, etc. highlighted (e.g., underlined, bolded, colored, shaded, etc.) so that a user is able to identify the structure of the text 2510.

Accordingly, a parallel display of the source text and the cascade formatted text may be presented via two screens or split screen in parallel presentation. For example, original source text may be displayed on one screen and the cascade text is displayed in parallel on a second screen and may be synced so when a user scrolls on either display they stay synchronized. This may be used for educational purposes to highlight syntax, key phrases, part-of-speech, constituency data, dependency data, etc. or to present an "enhanced comprehension view" that is like a text X-RAY displaying the underlying structure of the text. For example, constituents, coreference information and key phrases may be bolded or not bolded, verbs may be colored or bolded, etc. to highlight underlying linguistic properties.

Figure 26:
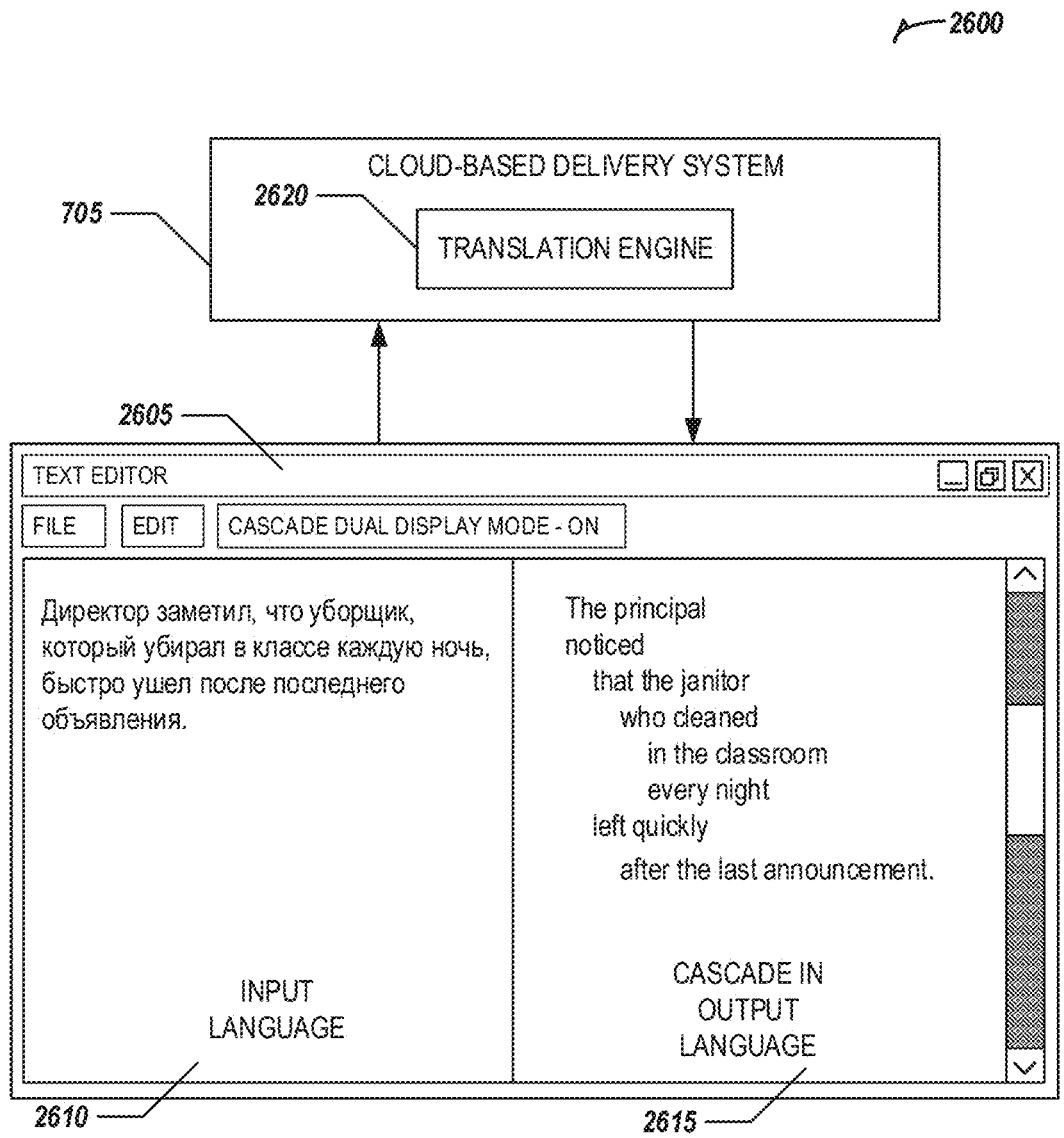
FIG. 26 illustrates an example of a system for translation of input text in a first language to a cascaded output in a second language for linguistically-driven automated text formatting, according to an embodiment.

FIG. 26 illustrates an example of a system 2600 for translation of input text in a first language 2610 to a cascaded output in a second language 2615 for linguistically-driven automated text formatting, according to an embodiment. A translation engine 2620 may receive the input in the first language 2610 and may translate the input into the second language. The translation engine may be executing locally on the device used to view a user interface 2605 that is displaying the input and the cascaded output in the second language 2615, remotely executing from a web service, cloud-based service, remote server, etc. The translation engine 2620 may include translation logic that, when executed on input text, converts the text from the input language to a second language.

The output from the translation engine 2620 may be processed by the cloud-based system 705 to produce the cascaded output in the second language 2615 as described above. For example, a cascade formatted passage may be displayed in one window of the screen while a translation of the passage in another language may be presented in cascaded format in a second window of the screen. In another example, block text may be displayed one side and cascade formatted text on the other side of a dual display. In yet another example, there is provided split screen scrolling in block and cascade and/or languages may be displayed on different sides of the screen or on different displays of a dual display configuration. Dual screens may allow a user to refer to the other view to assist in comprehension of difficult passages.

Figure 27:
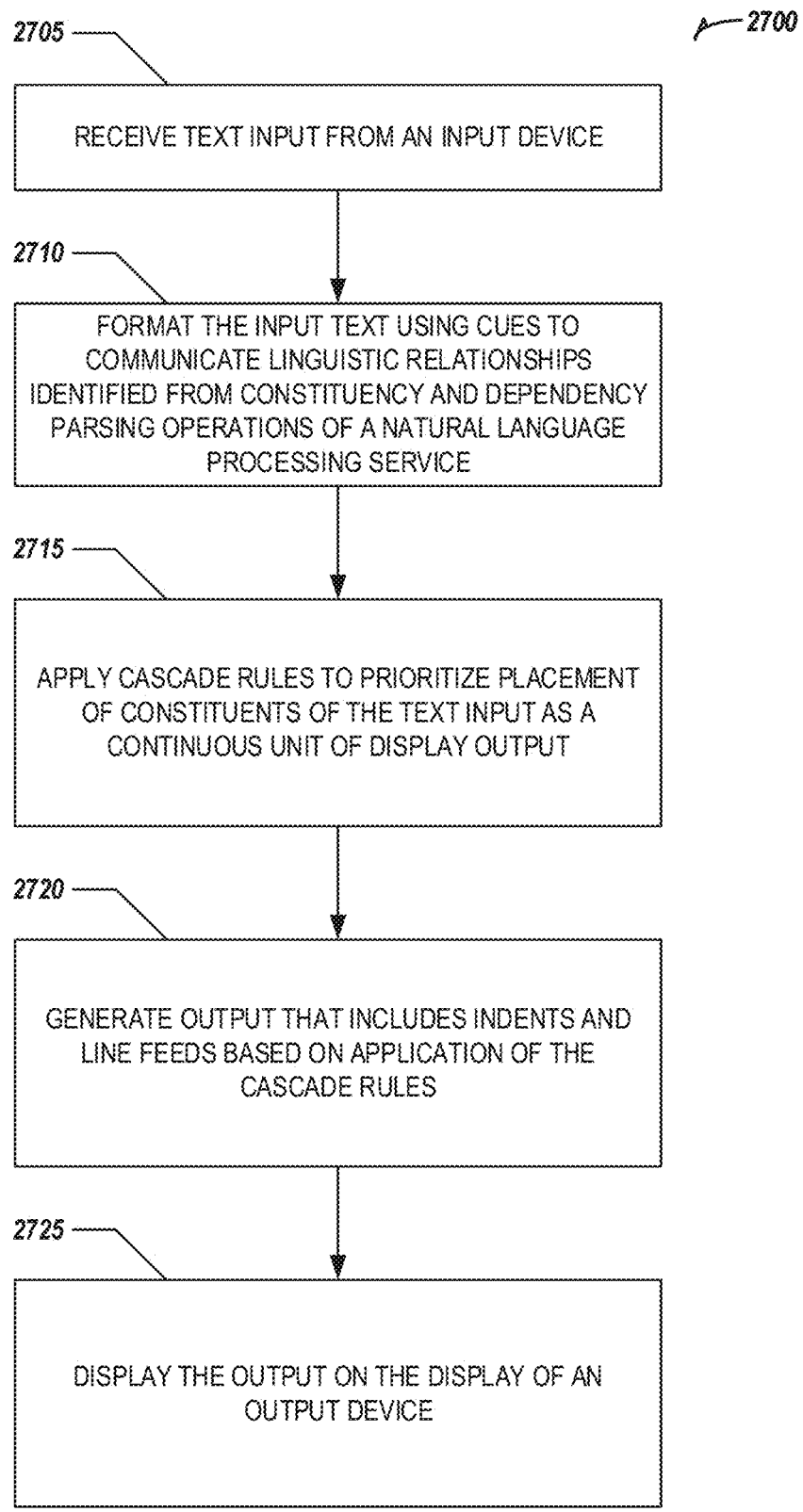
FIG. 27 illustrates an example of a method for linguistically-driven automated text formatting, according to an embodiment.

FIG. 27 illustrates an example of a method 2700 linguistically-driven automated text formatting, according to an embodiment. The method 2700 may provide features as described in FIGS. 1-5, 6A, 6B, and 7-26.

At operation 2705, text input may be received from an input device. At operation 2710, the input text may be formatted using cues to communicate linguistic relationships identified from constituency and dependency parsing operations of a natural language processing service.

At operation 2715, cascade rules may be applied to prioritize placement of constituents of the text input as a continuous unit of display output. The cascade rules may determine horizontal displacement of a constituent of the constituents based on information output from an automated dependency parser and may group the constituent with other constituents based on horizontal positioning to highlight dependency relationships. An unindent may indicate completion of a constituency group. In an example, the cascade rules may further identify core arguments and non-core dependents of the input text using rules that link dependencies to constituents. These rules may indent the core arguments and the non-core dependents under a head of a linguistic phrase of the input text.

At operation 2720, output may be generated that includes indents and line feeds based on application of the cascade rules. In an example, the output may be augmented with additional linguistic feature cues provided by the natural language processing service that includes coreference information, sentiment analysis, named-entity recognition, semantic role labeling, textual entailment, topic tracking, or prosodic analysis.

At operation 2725, the output may be displayed on the display of an output device. In an example, anonymized usage data or user-specified preferences may be received and a custom display profile may be generated that includes output display properties based on the anonymized usage data or the user-specified preferences. In an example, the output may be adjusted using the output display properties of the custom display profile. The display properties may modify display features of the output without modification of a shape of the output. In an example, the output may be generated for display on a phone, a tablet, a laptop, a monitor, a virtual reality device, or an augmented reality device. In an example, the output may be generated for display in a dual-screen format that displays a side-by-side text format, a format-while-edit format, or a cascade-and-translate format.

Figure 28:
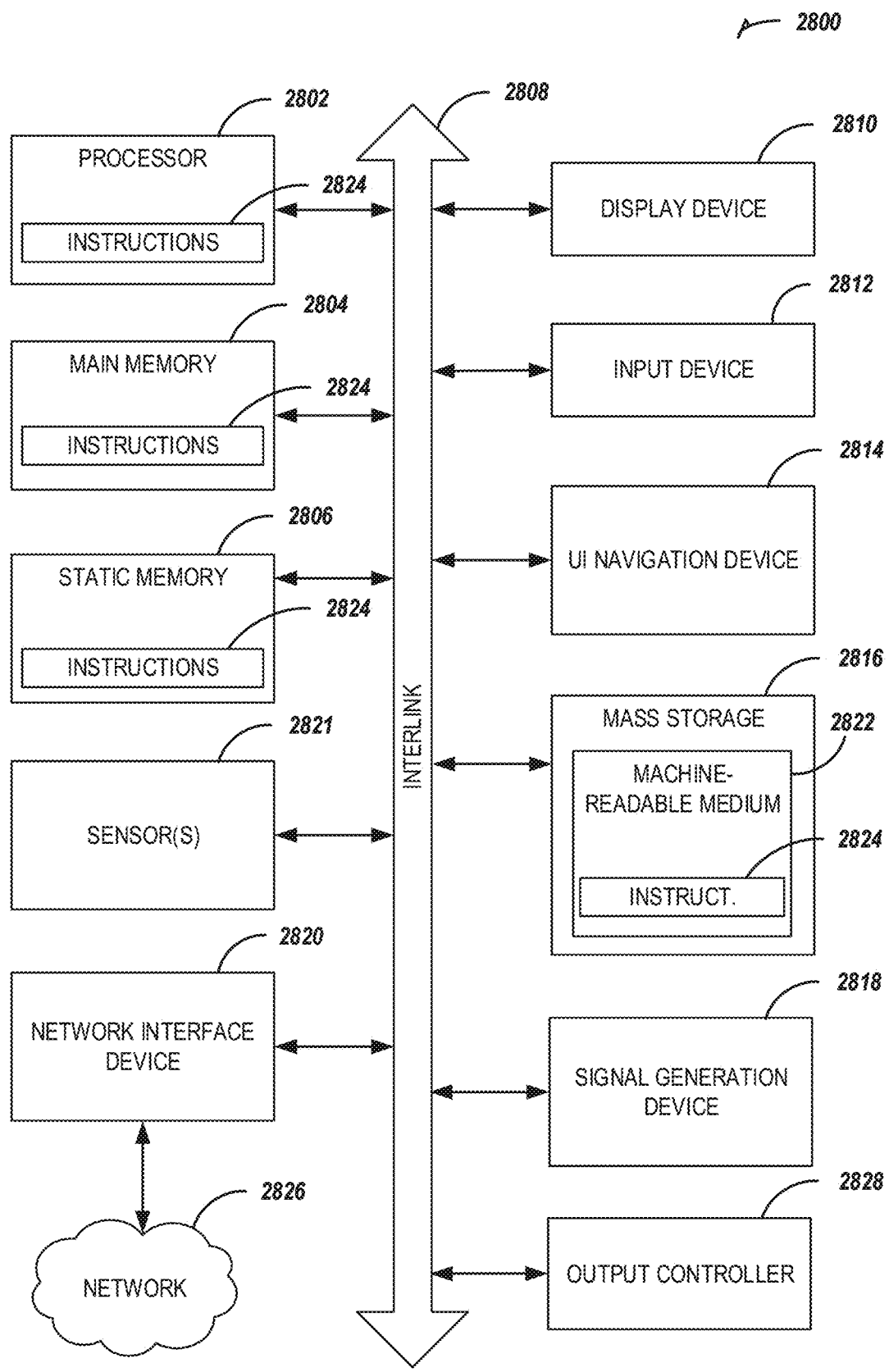
FIG. 28 is a block diagram illustrating an example of a machine upon which one or more embodiments may be implemented.

FIG. 28 illustrates a block diagram of an example machine 2800 upon which any one or more of the techniques (e.g., methodologies) discussed herein may perform. In alternative embodiments, the machine 2800 may operate as a standalone device or may be connected (e.g., networked) to other machines. In a networked deployment, the machine 2800 may operate in the capacity of a server machine, a client machine, or both in server-client network environments. In an example, the machine 2800 may act as a peer machine in peer-to-peer (P2P) (or other distributed) network environment. The machine 2800 may be a personal computer (PC), a tablet PC, a set-top box (SM), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 2800 may include a hardware processor 2802 (e.g., a central processing unit (CPU), a graphics processing unit (GPU), a hardware processor core, or any combination thereof), a main memory 2804 and a static memory 2806, some or all of which may communicate with each other via an interlink (e.g., bus) 2808. The machine 2800 may further include a display unit 2810, an alphanumeric input device 2812 (e.g., a keyboard), and a user interface (UI) navigation device 2814 (e.g., a mouse). In an example, the display unit 2810, input device 2812 and UI navigation device 2814 may be a touch screen display. The machine 2800 may additionally include a storage device (e.g., drive unit) 2816, a signal generation device 2818 (e.g., a speaker), a network interface device 2820, and one or more sensors 2821, such as a global positioning system (GPS) sensor, compass, accelerometer, or other sensors. The machine 2800 may include an output controller 2828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2816 may include a machine readable medium 2822 on which is stored one or more sets of data structures or instructions 2824 (e.g., software) embodying or utilized by any one or more of the techniques or functions described herein. The instructions 2824 may also reside, completely or at least partially, within the main memory 2804, within static memory 2806, or within the hardware processor 2802 during execution thereof by the machine 2800. In an example, one or any combination of the hardware processor 2802, the main memory 2804, the static memory 2806, or the storage device 2816 may constitute machine readable media.

While the machine readable medium 2822 is illustrated as a single medium, the term "machine readable medium" may include a single medium or multiple media (e.g., a centralized or distributed database, and/or associated caches and servers) configured to store the one or more instructions 2824.

The term "machine readable medium" may include any medium that is capable of storing, encoding, or carrying instructions for execution by the machine 2800 and that cause the machine 2800 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2824 may further be transmitted or received over a communications network 2826 using a transmission medium via the network interface device 2820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi@, LoRa@/LoRaWAN@ LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 2820 may include one or more physical jacks (e.g., Ethernet, coaxial, or phone jacks) or one or more antennas to connect to the communications network 2826. In an example, the network interface device 2820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2800, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for generating display of text that includes linguistic cues from an input text, comprising:
    at least one processor; and
    memory including instructions that, when executed by the at least one processor, cause the at least one processor to perform operations to:
        receive the input text, the input text originating from an input device;
        obtain constituency information and dependency information for the input text from constituency and dependency parsing operations of a natural language processing service, wherein the natural language processing service provides the constituency information and the dependency information as output from at least one automated parser;
        generate a language model from the constituency information and the dependency information, wherein the language model is a data structure comprising: a parse tree representing dependencies among constituents of the input text, and encoded data representing relationships between the constituents and dependencies of the constituents of the input text;
        apply cascade rules to the constituents of the input text, using the language model, the cascade rules comprising instructions to:
            determine a vertical arrangement of each constituent, wherein each constituent comprises a word or group of words that functions as an individual grammatical unit in a hierarchy of the parse tree of the generated language model, and wherein the vertical arrangement places the constituents of the input text into respective lines or continuous units; and
            determine a horizontal arrangement of each constituent, wherein one or more dependency relationships and a head of each constituent are determined from the encoded data of the language model, and wherein the horizontal arrangement provides a same horizontal displacement for the constituents of the input text that have a dependency relationship to a same head or a dependency relationship on each other;
generate output that includes indents and line feeds based on application of the vertical arrangement and the horizontal arrangement from the cascade rules; and
cause a display of the output on the display of an output device.

2. The system of claim 1, the cascade rules further comprising instructions to:
identify core arguments and non-core dependents in the constituents of the input text using rules that link dependents to a respective constituent that contains them;
wherein the horizontal arrangement is configured to indent the core arguments and the non-core dependents for the respective constituent under a head of a linguistic phrase of the input text; and
wherein the horizontal arrangement is configured to unindent to signal completion for the respective constituent and to align dependent constituents with each other.

3. The system of claim 1, wherein the output is augmented with additional linguistic feature cues provided by the natural language processing service that includes coreference information, sentiment analysis, named-entity recognition, semantic role labeling, textual entailment, topic tracking, or prosodic analysis.

4. The system of claim 1, the memory further comprising instructions that, when executed by the at least one processor, cause the at least one processor to perform operations to:
receive anonymized usage data or user-specified preferences; and
generate a custom display profile including output display properties based on the anonymized usage data or the user-specified preferences.

5. The system of claim 4, the memory further comprising instructions that, when executed by the at least one processor, cause the at least one processor to perform operations to:
adjust the output using the output display properties of the custom display profile, wherein the output display properties modify display features of the output without modification of a shape of the output.

6. The system of claim 1, wherein the output is generated for display on a phone, a tablet, a laptop, a monitor, a virtual reality device, or an augmented reality device.

7. The system of claim 1, wherein the output is generated for display in a dual-screen format that displays a side-by-side text format, a format-while-edit format, or a cascade-and-translate format.

8. The system of claim 1, wherein the constituency parsing operations of the natural language processing service satisfy one or more diagnostic tests to determine each constituent, the one or more diagnostic tests provided from among: i) do so/one substitution, ii) coordination, iii) topicalization, iv) ellipsis, v) clefting or pseudoclefting, vi) passivization, vii) wh-fronting, viii) right-node raising, ix) pronominal replacement, x) question answering, xi) omission, and xii) adverbial intrusion.

9. The system of claim 1, wherein the input text is presented in the output with at least one continuous unit that uses multiple lines on the display of the output device.

10. At least one non-transitory machine-readable medium including instructions for generating display of text that includes linguistic cues from an input text that, when executed by at least one processor of a computing device, cause the at least one processor to perform operations to:
receive the input text, the input text originating from an input device;
obtain constituency information and dependency information for the input text from constituency and dependency parsing operations of a natural language processing service, wherein the natural language processing service provides the constituency information and the dependency information as output from at least one automated parser;
generate a language model from the constituency information and the dependency information, wherein the language model is a data structure comprising: a parse tree representing dependencies among constituents of the input text, and encoded data representing relationships between the constituents and dependencies of the constituents of the input text;
apply cascade rules to the constituents of the input text, using the language model, the cascade rules comprising instructions to:
determine a vertical arrangement of each constituent, wherein each constituent comprises a word or group of words that functions as an individual grammatical unit in a hierarchy of the parse tree of the generated language model, and wherein the vertical arrangement places the constituents of the input text into respective lines or continuous units; and
determine a horizontal arrangement of each constituent, wherein one or more dependency relationships and a head of each constituent are determined from the encoded data of the language model, and wherein the horizontal arrangement provides a same horizontal displacement for the constituents of the input text that have a dependency relationship to a same head or a dependency relationship on each other;
generate output that includes indents and line feeds based on application of the vertical arrangement and the horizontal arrangement from the cascade rules; and
cause a display of the output on the display of an output device.

11. The at least one non-transitory machine-readable medium of claim 10, the cascade rules further comprising instructions to:
identify core arguments and non-core dependents in the constituents of the input text using rules that link dependents to a respective constituent that contains them;
wherein the horizontal arrangement is configured to indent the core arguments and the non-core dependents for the respective constituent under a head of a linguistic phrase of the input text; and
wherein the horizontal arrangement is configured to unindent to signal completion for the respective constituent and align dependent constituents with each other.

12. The at least one non-transitory machine-readable medium of claim 10, wherein the output is augmented with additional linguistic feature cues provided by the natural language processing service that includes coreference information, sentiment analysis, named-entity recognition, semantic role labeling, textual entailment, topic tracking, or prosodic analysis.

13. The at least one non-transitory machine-readable medium of claim 10, further comprising instructions that, when executed by the at least one processor, cause the at least one processor to perform operations to:
receive anonymized usage data or user-specified preferences; and generate a custom display profile including output display properties based on the anonymized usage data or the user-specified preferences.

14. The at least one non-transitory machine-readable medium of claim 13, further comprising instructions that, when executed by the at least one processor, cause the at least one processor to perform operations to:
adjust the output using the output display properties of the custom display profile, wherein the output display properties modify display features of the output without modification of a shape of the output.

15. The at least one non-transitory machine-readable medium of claim 10, wherein the output is generated for display in a dual-screen format that displays a side-by-side text format, a format-while-edit format, or a cascade-and-translate format.

16. The at least one non-transitory machine-readable medium of claim 10, wherein the constituency parsing operations of the natural language processing service satisfy one or more diagnostic tests to determine each constituent, the one or more diagnostic tests provided from among: i) do so/one substitution, ii) coordination, iii) topicalization, iv) ellipsis, v) clefting or pseudoclefting, vi) passivization, vii) wh-fronting, viii) right-node raising, ix) pronominal replacement, x) question answering, xi) omission, and xii) adverbial intrusion.

17. The at least one non-transitory machine-readable medium of claim 10, wherein the input text is presented in the output with at least one continuous unit that uses multiple lines on the display of the output device.

18. A method for generating display of text including linguistic cues from an input text, comprising:
receiving the input text, the input text originating from an input device;
obtaining constituency information and dependency information for the input text from constituency and dependency parsing operations of a natural language processing service, wherein the natural language processing service provides the constituency information and the dependency information as output from at least one automated parser;
generating a language model from the constituency information and the dependency information, wherein the language model is a data structure comprising: a parse tree representing dependencies among constituents of the input text, and encoded data representing relationships between the constituents and dependencies of the constituents of the input text;
applying cascade rules to the constituents of the input text, using the language model, the cascade rules comprising instructions to:
determine a vertical arrangement of each constituent, wherein each constituent comprises a word or group of words that functions as an individual grammatical unit in a hierarchy of the parse tree of the generated language model, and wherein the vertical arrangement places the constituents of the input text into respective lines or continuous units; and
determine a horizontal arrangement of each constituent, wherein one or more dependency relationships and a head of each constituent are determined from the encoded data of the language model, and wherein the horizontal arrangement provides a same horizontal displacement for the constituents of the input text that have a dependency relationship to a same head or a dependency relationship on each other;
generating output that includes indents and line feeds based on application of the vertical arrangement and the horizontal arrangement from the cascade rules; and
causing a display of the output on the display of an output device.

19. The method of claim 18, wherein the cascade rules further comprise:
identifying core arguments and non-core dependents in the constituents of the input text using rules that link dependents to a respective constituent that contains them;
wherein the horizontal arrangement is configured to indent the core arguments and the non-core dependents for the respective constituent under a head of a linguistic phrase of the input text; and
wherein the horizontal arrangement is configured to unindent to signal completion for the respective constituent and align dependent constituents with each other.

20. The method of claim 18, wherein the output is augmented with additional linguistic feature cues provided by the natural language processing service that includes coreference information, sentiment analysis, named-entity recognition, semantic role labeling, textual entailment, topic tracking, or prosodic analysis.

21. The method of claim 18, further comprising:
receiving anonymized usage data or user-specified preferences; and
generating a custom display profile including output display properties based on the anonymized usage data or the user-specified preferences.

22. The method of claim 21, further comprising:
adjusting the output using the output display properties of the custom display profile, wherein the output display properties modify display features of the output without modification of a shape of the output.

23. The method of claim 18, wherein the output is generated for display on a phone, a tablet, a laptop, a monitor, a virtual reality device, or an augmented reality device.

24. The method of claim 18, wherein the output is generated for display in a dual-screen format that displays a side-by-side text format, a format-while-edit format, or a cascade-and-translate format.

25. The method of claim 18, wherein the constituency parsing operations of the natural language processing service satisfy one or more diagnostic tests to determine each constituent, the one or more diagnostic tests provided from among: i) do so/one substitution, ii) coordination, iii) topicalization, iv) ellipsis, v) clefting or pseudoclefting, vi) passivization, vii) wh-fronting, viii) right-node raising, ix) pronominal replacement, x) question answering, xi) omission, and xii) adverbial intrusion.

26. The method of claim 18, wherein the input text is presented in the output with at least one continuous unit that uses multiple lines on the display of the output device.

* * * * *